United States Patent
Bhattacharjee et al.

(10) Patent No.: US 11,010,657 B2
(45) Date of Patent: May 18, 2021

(54) DATA ENGINES BASED ON NEURAL NETWORK CONFIGURATIONS

(71) Applicant: PAYPAL, INC., San Jose, CA (US)

(72) Inventors: Sandeep Bhattacharjee, Chennai (IN); Ponnivalavan Subramanian, Chennai (IN); Ramprasad Subburaman, Chennai (IN); Komal Bansal, New Delhi (IN); Shyam Rangachari Vangipuram, Chennai (IN); Indrajit Datta, Chennai (IN); Chandrashekhar Subramanian, Chennai (IN)

(73) Assignee: PayPal Inc., San Jose, CA (US)

( * ) Notice: Subject to any disclaimer, the term of this patent is extended or adjusted under 35 U.S.C. 154(b) by 1434 days.

(21) Appl. No.: 15/130,902

(22) Filed: Apr. 15, 2016

(65) Prior Publication Data

US 2017/0300805 A1    Oct. 19, 2017

(51) Int. Cl.
*G06N 3/02*    (2006.01)
*G06F 11/07*    (2006.01)

(52) U.S. Cl.
CPC .......... *G06N 3/02* (2013.01); *G06F 11/0736* (2013.01)

(58) Field of Classification Search
CPC ..................................................... G06N 3/02
See application file for complete search history.

(56) References Cited

PUBLICATIONS

Dissananayake, B. M. M., C. H. Hendahewa, and A. S. Karunananda. "Artificial Neural Network approach to credit risk assessment." 2007 International Conference on Industrial and Information Systems. IEEE, 2007. (Year: 2007).*

Yap, Bee Wah, Seng Huat Ong, and Nor Huselina Mohamed Husain. "Using data mining to improve assessment of credit worthiness via credit scoring models." Expert Systems with Applications 38.10 (2011): 13274-13283. (Year: 2011).*

Hodge, Victoria, and Jim Austin. "A survey of outlier detection methodologies." Artificial intelligence review 22.2 (2004): 85-126. (Year: 2004).*

Angelini, E., di Tollo, G., & Roli, A. (2008). A neural network approach for credit risk evaluation. The quarterly review of economics and finance, 48(4), 733-755. (Year: 2008).*

* cited by examiner

*Primary Examiner* — Benjamin P Geib
(74) *Attorney, Agent, or Firm* — Haynes & Boone, LLP

(57) ABSTRACT

Various systems, mediums, and methods may involve data engines configured to generate results associated with one or more entities based on neural network configurations. An exemplary system includes a data engine with a training module, a working module, an incremental training module, and a neural network. The data engine may process data associated with the one or more entities and transfer the processed data to an input layer of the neural network. Further, outputs from the input layer may be transferred to a hidden layer of the neural network. Yet further, outputs from the hidden layer may be transferred to an output layer of the neural network. As such, one or more results may be generated from an output layer of the neural network. The one or more results may include an assessment score of the one or more entities.

20 Claims, 10 Drawing Sheets

DATA ENGINES BASED ON NEURAL NETWORK CONFIGURATIONS

TECHNICAL FIELD

This disclosure generally relates to data engines configured to generate various results associated with one or more entities based on neural network configurations.

BACKGROUND

Various types of computation engines involve a number of inputs and one or more corresponding outputs. In particular, the inputs may be provided by a number of different sources. As such, the computation engine may determine which inputs to utilize and which inputs to discard, possibly based on the particular sources that provide the inputs. Under various circumstances, the computation engine may utilize such selected inputs to determine one or more corresponding outputs. In some instances, the one or more outputs may be a particular type of a score.

Multiple types of scores may be computed. For example, a score may reflect a given value or a quality of an entity, such as a credit score, a net value score, and/or multiple scores that contribute to a company score card, among other types of scores related to the entity. In some instances, the score may be based on various inputs, analyses, computations, and/or evaluations performed with the computation engine. For example, a given score may be computed based on analyzing a history input, a status input, and/or a production input, among other forms of inputs. Yet, in some respects, the computed score may be utilized to determine potential risks based on possibly associating with the particular entity. In some instances, the computed score may be inaccurate or erroneous, possibly leading to unreliable measures or parameters associated with the particular entity. As such, the computation engine utilized to determine the score may be integral to those that choose to associate with the entity.

As demonstrated in the example above, there is much need for technological advancements in various aspects of computation engines and related technologies to accurately determine scores associated with various entities.

Figure 1:
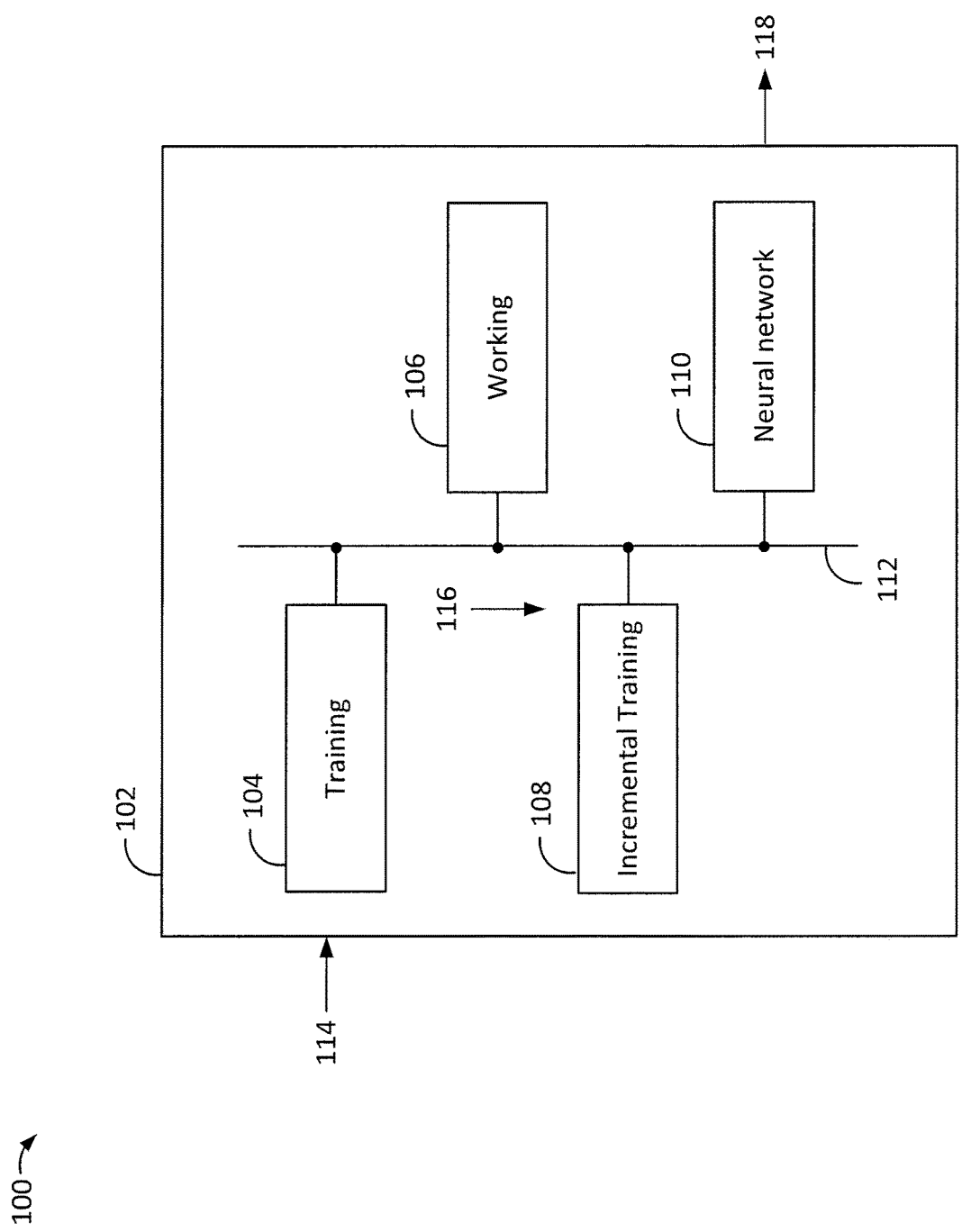
FIG. 1 is a block diagram of an exemplary system, according to an embodiment.

Embodiments of the present disclosure and their advantages may be understood by referring to the detailed description herein. It should be appreciated that reference numerals may be used to illustrate various elements and features provided in the figures. The figures may illustrate various examples for purposes of illustration and explanation related to the embodiments of the present disclosure and not for purposes of any limitation.

DETAILED DESCRIPTION

As described in the scenarios above, there may be various approaches to assessing, evaluating, and/or measuring aspects of one or more entities. The entities may include companies, enterprises, films, partnerships, and/or syndicates, among other types of organizations. Further, the entities may also include groups of users of computing devices and/or services, individual users, among other possibilities. Yet further, the entities may include any objects that can be associated with a potential value. Example embodiments herein describe data engines and related technologies to generate accurate results that assess entities based on neural network configurations.

In some embodiments, an exemplary system may include a data engine configured to generate one or more results to assess entities. The data engine may include a number of hardware components, such as hardware modules. For example, the data engine may include a training module, possibly also referred to as an initial training module, which may be used to configure a neural network. Further, the data engine may also include a working module and an incremental training module configured to operate with the neural network to generate one or more results. Notably, the modules may be implemented with hardware, software, or possibly with aspects of both hardware and software.

FIG. 1 is a simplified block diagram of an exemplary system 100, according to an embodiment. As shown, the system 100 includes a data engine 102. The data engine 102 includes a training module 104, possibly also referred to as an initial training module 104. Further, the data engine 102 also includes a working module 106. Yet further, the data engine 102 also includes an incremental training module 108. In addition, the data engine 102 includes a neural network 110. In some embodiments, the training module 104, the working module 106, the incremental training module 108, and the neural network 110 may take the form of hardware components, such as a processor, an application specific integrated circuit (ASIC), a programmable system-on-chip (SOC), a field-programmable gate array (FPGA), and/or programmable logic devices (PLDs), among other possibilities. As shown, the training module 104, the working module 106, the incremental training module 108, and the neural network 110 may be coupled to a bus, network, or other connection 112. Yet, it should be noted that any two or more of the training module 104, the working module 106, the incremental training module 108, and the neural network 110 may be combined to take the form of a single hardware component, such as the programmable SOC.

The training module 104 may be configured to collect data 114 and also process the data 114. As shown, the training module 104 may output the processed data 116. Further, the data engine 102 may configure the neural network 110 with the processed data 116. For example, the training module 104 may collect data 114 during an initial data training phase. The collected data 114 may be associated with various aspects of one or more entities. In particular, the collected data 114 may include details of the one or more entities, possibly including an indication of credibility associated with the one or more entities. The indication of credibility may include a range of credibility, possibly spanning from highly credible to mildly credible, mildly credible to low credibility, and/or low credibility to no credibility. Further, the collected data 114 may include details of companies identified from the one or more entities. Various details of the companies may include characteristics of the companies, such as assets, liabilities, banking statements, revenue, costs, profits, the age of the companies, the number of employees of the companies, among other possible characteristics.

As noted, the training module 104 may be configured to process the collected data 114. In some embodiments, the collected data 114 may be processed based on the neural network 110 and/or the configurations of the neural network 110, as described further herein. In some instances, the training module 104 may detect text data from the collected data 114 and convert the text data to numeric data. For example, one or more of the characteristics described above may take the form of text data in the collected data 114. In particular, the characteristics of the companies may be provided in text data, such as text describing the assets or the types of assets, the liabilities or the types of liabilities, and/or various statements associated with the companies, among the other characteristics described above. As such, the text describing the assets, the liabilities, and/or the statements may be converted from text data to numeric data. In some instances, the numeric data may be part of the processed data 116 transferred to the neural network 110.

In some embodiments, the training module 104 may normalize the collected data 114. For example, the training module 104 may normalize the collected data 114 such that the data related to the one or more characteristics described above may be compared. For instance, data associated with the assets of an entity may be compared with the data associated with the liabilities of the entity. Further, a value representing the assets may be compared with a separate value representing the liabilities. Yet further; these values may be compared with another separate value representing the credibility of the entity. In some instances, the values representing the assets, the liabilities, and the credibility of the entity may be normalized to the same or similar scale, such as a scale from zero to one hundred. With various such values measured on the same scale, the values may be compared and/or analyzed accordingly.

In some instances, the training module 104 may normalize the collected data 114 by organizing, arranging, ordering, and/or structuring the collected data 114. Further, the training module 104 may normalize the collected data 114 by removing redundant data sets from the collected data 114. In some instances, the training module 104 may normalize the collected data 114, where the data 114 may correspond to the one or more of the characteristics of the companies described above, such as the assets, the liabilities, and/or the statements associated with the companies. As such, the characteristics may be structured into a number of tables to minimize the size of the data 114, without losing information or data. In some instances, the collected data 114 may be normalized based on the neural network 110 and/or the configurations of the neural network 110, as described further herein. As noted above, In some embodiments, the training module 104 may detect and/or remove one or more outliers from the collected data 114. As noted, respective values representing the characteristics of the entity (e.g., the assets, the liabilities, and the credibility of the entity) may be normalized to the same or similar scale, such as a scale from zero to one hundred. Further, the training module 104 may detect and/or remove outliers from the collected data 114 based on the deviations of the outliers from mean values associated with the collected data 114. In particular, the training module 104 may detect outliers by retrieving a number of samples from the collected data 114. The training module 104 may determine one or more mean values that correspond to the number of samples. The training module 104 may also determine a standard deviation associated with the number of samples. As such, the training module 104 may detect and remove one or more outliers from a given sample based at least on the outliers deviating from the standard deviation.

In some embodiments, the training module 104 may detect and remove outliers using one or more formulas and/or functions. For example, the training module 104 may detect outliers in the collected data 114 using one or more formulas or functions associated with a given sample ("x") from the collected data 114. The one or more formulas or functions may also include a mean value ("mean") of all the samples from the collected data 114, where there is a number ("n") of the samples from the collected data 114. Further, the one or more formulas or functions may utilize the standard deviation ("stdv") of all the samples from the collected data 114. In some instances, the outliers may be detected using the formula or function below:

if (sample (x)−mean)>number of samples (n)*stdv,
then sample (x) is an outlier

As illustrated above, if the difference between the sample (x) and the mean is greater than a product of the number of samples (n) and the standard deviation (stdv), then the sample (x) is detected to be an outlier. As such, the training module 104 may remove the sample (x) accordingly.

In some instances, the standard deviation (stdv) may quantify the amount of variation and/or dispersion associated with the sample (x). As such, in some instances where the samples from the collected data 114 are highly dispersed, the training module 104 may detect fewer outliers. Yet, in some instances where the samples are closely grouped or clustered, the training module 104 may detect more or additional outliers. As such, the training module 104 may detect and remove such outliers under various aspects of the collected data 114. Notably, the training module 104 may detect and remove outliers from the processed and/or normalized data 116, and/or possibly other forms of data. In some instances, the training module 104 may remove the outliers based on the neural network 110 and/or the configurations of the neural network 110, as described further herein. As such, the training module 104 may detect outliers more efficiently, thereby performing unconventional steps in particularly useful applications for training the processed and/or normalized data 116.

In some embodiments, the training module 104 may configure the neural network 110. As shown, the training module 104 may transfer the processed data 116 to the neural network 110, possibly over the bus, network, or other connection 112. In some instances, the processed data 116 may be transferred to the neural network 110 to configure the neural network 110. In some instances, the one or more results 118 may be obtained based on transferring the processed data 116 to the neural network 110. For example, the neural network 110 may output the one or more results 118, possibly based on configuring the neural network 110 with the processed data 116.

In some embodiments, the data engine 102 may determine one or more expected results, possibly based on the collected data 114. For example, the data engine 102 may determine the one or more expected results to include a score associated with the one or more entities that correspond to the collected data 114. As such, the data engine 102 may measure or compare the one or more results 118 with the expected results. Further, the data engine 102 may determine an error or error rate based on measuring and/or comparing the one or more results 118 with the expected results. In some instances, the error and/or the error rate may be under a given tolerance limit determined by the data engine 102. In such instances, the data engine 102 may stop training the neural network 110 based on the error and/or the error rate being under the tolerance limit. Further, the data engine 102 may determine the neural network 110 is ready for production based on the error and/or the error rate.

In some embodiments, the incremental training module 108 may further train aspects of the data engine 102, possibly based on the neural network 110 being trained with the processed data 116. For example, the module 108 may collect additional data related to one or more given entities, possibly taking similar form to the collected data 114 including text and numerical data. In particular, the module 108 may process the additional data and transfer the processed data to the neural network 110. Further, the neural network 110 may output one or more additional results, possibly taking similar form to the one or more results 118. As such, the incremental training module 108 may further train the neural network 110.

In some embodiments, the working module 106 may transfer additional data and/or a stream of data to the neural network 110, possibly based on the neural network 110 being trained and/or incrementally trained, as described above. For example, the working module 106 may collect one or more streams of data, possibly where the data is associated with one or more additional entities. Further, the working module 106 may transfer the data to the neural network 110 to obtain further results, possibly including an assessment score that represents the one or more additional entities. In some instances, the assessment score may take the form of a numerical expression based on the various layers of the neural network 110. In particular, the assessment score may represent an assessment of trustworthiness, dependability, credibility, creditworthiness, solvency, and/or risk, among other features and/or characteristics associated with the one or more additional entities. In some instances, the score may include a credit score, a net value score, and/or a company score card associated with the one or more additional entities, possibly based on credit report information provided as input data 114.

Figure 2A:
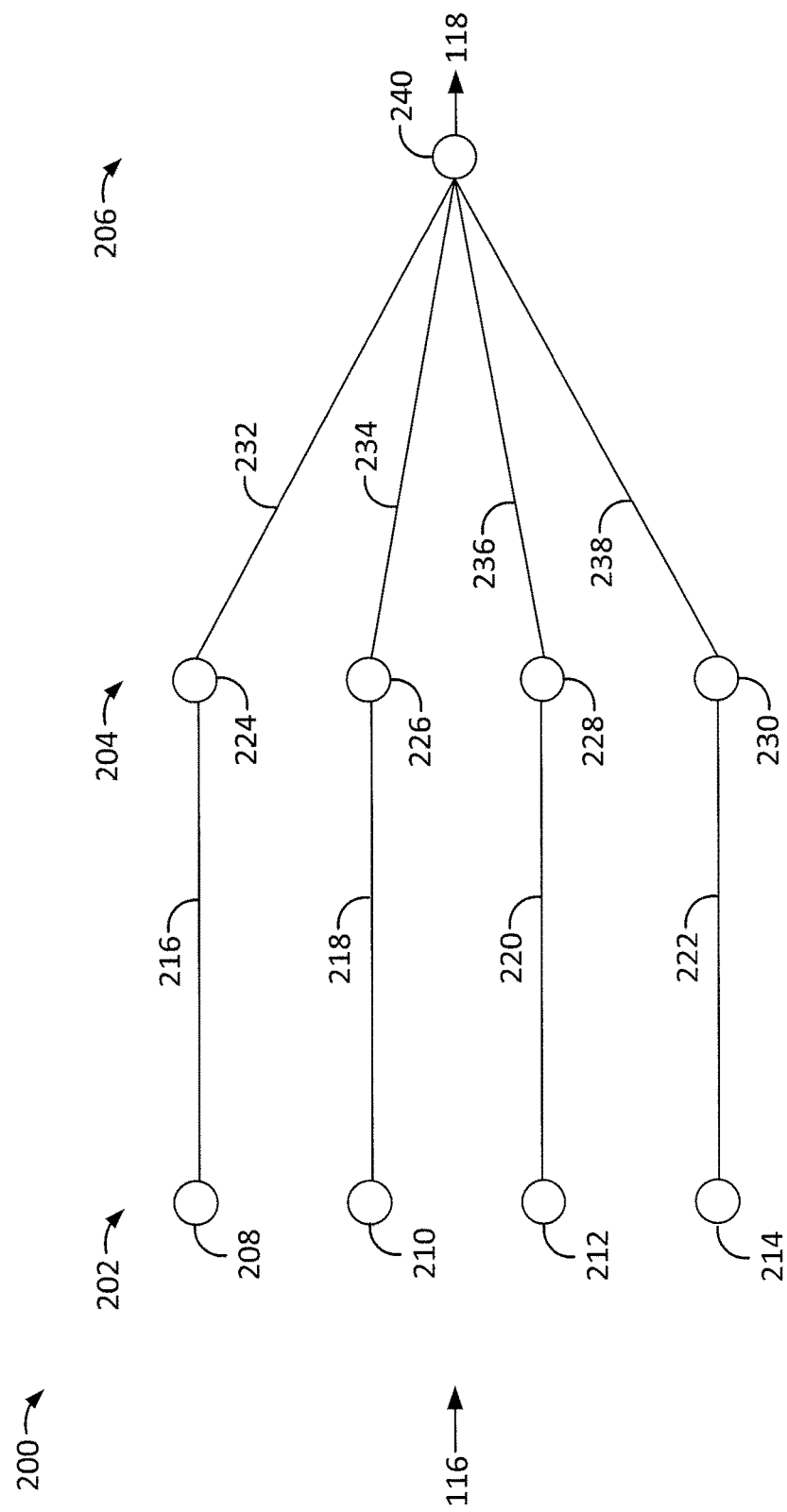
FIG. 2A illustrates an exemplary neural network, according to an embodiment.

FIG. 2A illustrates an exemplary neural network 200, according to an embodiment. In some instances, the neural network 200 may take the form of the neural network 110 described above in relation to FIG. 1, such that the neural network 200 is configured with one or more modules 104, 106, 108, and/or 110. As shown, the neural network 200 includes an input layer 202, a hidden layer 204, and an output layer 206. The input layer 202 includes input nodes 208-214, the hidden layer 204 includes hidden nodes 224-230, and the output layer 206 includes the output node 240. Further, the input nodes 208, 210, 212, and 214 may correspond to the hidden nodes 224, 226, 228, and 230, respectively. In particular, the edges 216, 218, 220, and 222 may transfer data and/or values from the input nodes 208, 210, 212, and 214 to the hidden nodes 224, 226, 228, and 230, respectively. Further, the edges 232, 234, 236, and 238 may transfer data and/or values from the hidden nodes 224, 226, 228, and 230 to the output node 240.

Considering the scenarios above, one or more of the modules 104, 106, and/or 108 described above may transfer the processed data 116 to the input nodes 208-214. For example, asset and/or equity data from the processed data 116 may be transferred to the input node 208. Liability data from the processed data 116 may be transferred to the input node 210. Banking data from the processed data 116 may be transferred to the input node 212. Revenue, cost, operating income, and/or profit data from the processed data 116 may be transferred to the input node 214. Thus, various forms of data from the processed data 116 described above may be transferred from the input nodes 208-214. Further, the various forms of data may be transferred over the edges 216-222 to the hidden nodes 224-230. Yet further, the various forms of data may be transferred over the edges 232-238 to the output node 240. As such, the one or more results 118 may be generated.

Notably, other forms of data from the processed data 116 associated with the entity, e.g., a given company, may also be transferred to the input nodes 208-214. For example, data indicating the stock price of the company, the highs and lows of the stock price over one or more periods of time, the average daily volumes or shares of the company, the market capital of the company, the dividends associated with the company, the age of the company, the number of employees at the company, the subsidiaries of the company, the funding accumulated for the company, and/or the founders of the company, among other forms of data associated with the company may also be transferred to the input nodes 208-214.

In some embodiments, the input nodes 208-214 may receive the data 116 from one or more modules 104-110 of the data engine 102. Yet further, the input nodes 208-214 may be programmable. In some instances, the input nodes 208-214 may be programmed to apply one or more functions, $f_{node}$(input data), to the data 116 transferred to the nodes 208-214. For example, the node 208 may be programmed to apply one or more functions, $f_{208}$(input data), to the asset and/or equity data described above, possibly to perform asset valuations based on absolute value (e.g., present value), relative value (e.g., market value), and/or option value models to determine an asset output value. The node 210 may be programmed to apply one or more functions, $f_{210}$(input data), to the liability data, possibly to perform liability valuations based on various models described above to determine a liability output value. The node 212 may be programmed to apply one or more functions, $f_{212}$(input data), to the banking data, possibly to perform valuations based on various models described above to determine a banking output value. The node 214 may be programmed to apply one or more functions, $f_{214}$(input data), to the revenue, cost, and/or profit data, possibly to perform valuations based on various models described above to determine a profit output value.

In some embodiments, the functions noted above, $f_{208}$(input data), $f_{210}$(input data), $f_{212}$(input data), and $f_{214}$(input data) may also be used to normalize the processed data 116. In particular, the asset output value, the liability output value, the banking output value, and the profit output value may be a normalized or scaled value, for example, a value from a scale of zero to one hundred. In particular, the asset output value may be 99, the liability output value may be 55, the banking output value may be 60, and the profit output value may be 98. As such, the particular entity assessed may reflect stronger assets and profitability, as opposed to the entity's liability and/or banking statements, e.g., operating income. Notably, in such instances, a lower liability score may be preferred. It should also be noted that the examples are provided above for purposes of illustration and explanation, as other values may be used in reference to Fair, Isaac, and Company (FICO) credit scores potentially ranging from 300-850, Vantage credit scores potentially ranging from 501 to 990, Experian scores potentially ranging from 360 to 840, and Equifax scores potentially ranging from 280-580.

In some embodiments, the functions noted above, $f_{208}$ (input data), $f_{210}$(input data), $f_{212}$(input data), and $f_{214}$(input data) may be used to detect and remove outliers. For example, these functions may include the formula or function described above involving a given sample ("x") from the collected data 114. In particular, the formulas may involve a mean value ("mean") of all the samples from the collected data 114, where there is a number ("n") of the samples from the collected data 114. Further, the one or more formulas or functions may utilize the standard deviation ("stdv") of all the samples from the collected data 114. In some instances, the outliers may be detected using the formula or function described herein.

In some embodiments, a threshold value may be pre-determined and/or set for each of the input nodes 208-214. In some instances, a given output value from one of the input nodes 208-214 may meet or exceed its respective threshold value. In such instances, the output value flows out of the given node. Yet, in some instances, the given output value from one of the input nodes 208-214 may not meet or exceed its respective threshold value. Under such circumstances, the output value may become a zero or a null value. For example, considering the scenario above, a threshold value of 60 may be pre-determined for the asset output value, such that if the asset output value drops below 60, then the asset output value does not meet or exceed the threshold value, thereby making the output value zero or null.

In some embodiments, the edges 216-222 may be assigned with weights, possibly based on training the neural network 200. In some instances, each of the edges 216-222 may be assigned a respective weight. For example, the output value, e.g., the asset value from the node 208, may be multiplied by the respective weight assigned to the edge 216 and transferred to the node 224. The output value, e.g., the liability value from the node 210, may be multiplied by the respective weight assigned to the edge 218 and transferred to the node 226. The output value, e.g., the banking value from the node 212, may be multiplied by the respective weight assigned to the edge 220 and transferred to the node 228. The output value, e.g., the profit value from the node 214, may be multiplied by the respective weight assigned to the edge 222 and transferred to the node 230. Notably, the respective weights assigned to each of the edges 216-222 may be varied by the neural network 200 based on multiple circumstances or factors, potentially involving previous results fed back into the neural network 200, possibly as described further below. For example, the neural network 200 may increase the weight assigned to the edge 216 based on previous results and/or an interest in the one or more results 118 reflecting more weight on the asset output value.

In some embodiments, the hidden nodes 224-230 may also be programmable. In some instances, the hidden nodes 224-230 may be programmable in ways similar to those described above in relation to the input nodes 208-214. For example, the hidden nodes 224-230 may be programmed to apply one or more functions, $f_{node}$(value), to the values or weighted values transferred to the nodes 224-230. For example, the node 224 may be programmed to apply one or more functions, $f_{224}$(weighted value), to the weighted asset value described above, possibly to perform additional functions to determine a second asset value. The node 226 may be programmed to apply one or more functions, $f_{226}$ (weighted value), to the weighted liability value, possibly to perform additional functions to determine a second liability value. The node 228 may be programmed to apply one or more functions, $f_{228}$(weighted value), to the weighted banking value, possibly to perform additional functions to determine a second banking value. The node 230 may be programmed to apply one or more functions, $f_{230}$(weighted value), to the weighted profit value, possibly to perform additional functions to determine a second profit value.

In some embodiments, a threshold value may be determined or set for each of the hidden nodes 224-230, possibly similar to the input nodes 208-214 as described above. In some instances, the functions described above including, $f_{224}$(weighted value), $f_{226}$(weighted value), $f_{228}$(weighted value), and $f_{230}$(weighted value), may apply the threshold values at each of the hidden nodes 224-230, respectively. In some instances, a given output value from one of the hidden nodes 224-230 may meet or exceed its respective threshold value. In such instances, the output value flows out of the given node. Yet, in some instances, the given output value from one of the hidden nodes 224-230 may not meet or exceed its respective threshold value. Under such circumstances, the functions described above may change the output value to be a zero or a null value.

For example, consider a scenario where the one or more functions described above is applied to a weighted asset value of 95, a weighted liability value of 60, a weighted banking value 65, and a weighted profit value of 94. As such, the one or more functions may be described as $f_{224}$(weighted asset value), $f_{226}$(weighted liability value), $f_{228}$(weighted banking value), and $f_{230}$(the weighted profit value). In particular, the function, $f_{226}$(weighted liability value), may be applied on the weighted liability value of 60, where a threshold value of 60 may be predetermined for the weighted liability value. Thus, the weighted liability value of 60 meets the threshold value of 60, such that the output from the node 226 is equal to 60. Yet, the function, $f_{228}$ (weighted banking value), may be applied on the weighted banking value of 65, where a threshold value of 66 may be predetermined for the weighted banking value. Thus, the weighted banking value of 65 does not meet or exceed the threshold value of 66, thereby making the output from the node 228 zero or a null value. Further, the one or more results 118 may be based on the output from the node 226 being 60 and the output from the node 228 being zero or a null value, possibly removing the weighted banking value from being reflected in the one or more results 118.

In some embodiments, the edges 232-238 may be assigned with weights, possibly similar to the edges 216-222 as described above. In particular, edges 232-238 may be assigned with weights based on training the neural network 200. In some instances, each of the edges 232-238 may be assigned a respective weight. For example, the output value, e.g., the second asset value from the node 224, may be multiplied by the respective weight assigned to the edge 232 and transferred to the node 240. The output value, e.g., the second liability value from the node 226, may be multiplied by the respective weight assigned to the edge 234 and transferred to the node 240. The output value, e.g., the second banking value from the node 228, may be multiplied by the respective weight assigned to the edge 236 and transferred to the node 240. The output value, e.g., the second profit value from the node 230, may be multiplied by the respective weight assigned to the edge 238 and transferred to the node 240. Notably, the respective weights assigned to each of the edges 232-238 may be varied by the neural network 200 based on multiple circumstances, as described above.

In some embodiments, the output node 240 may also be programmable. In some instances, the output node 240 may be programmable in ways similar to those described above in relation to the input nodes 208-214 and the hidden nodes 224-230. For example, the output node 240 may be programmed to apply one or more functions, $f_{node}$(second weighted value), to the second weighted values transferred to the node 240. For example, the node 240 may be programmed to apply one or more functions, $f_{240}$(second weighted values), to the second weighted asset value, the second weighted liability value, the second weighted banking value, and the second weighted profit value, described above. As such, the node 240 may output the one or more results 118. For example, the node 240 may output a number of scores based on the one or more functions, $f_{240}$(second weighted values). In particular, as noted above, the scores may include FICO credit scores potentially ranging from 300-850, Vantage credit scores potentially ranging from 501 to 990, Experian scores potentially ranging from 360 to 840, and Equifax scores potentially ranging from 280-580.

For example, consider a scenario where the one or more functions described above is applied to a second weighted asset value of 92, a second weighted liability value of 60, a second weighted banking value of zero or a null value, and a second weighted profit value of 94. As such, the one or more functions may be described as $f_{240}$(92, 60, zero or a null value, and 94). As such, the node 240 may output a number of scores described above, including the FICO credit scores potentially ranging from 300-850, Vantage credit scores potentially ranging from 501 to 990, Experian scores potentially ranging from 360 to 840, and Equifax scores potentially ranging from 280-580. It should be noted that the neural network 200 may take various other forms. For example, the input layer 202 may include as many nodes as there may be features and/or characteristics in the processed data 116. Further, as shown, there are four hidden nodes 224-230, however, there may be fewer or more hidden nodes in other applications or arrangements of the neural network 200.

Figure 2B:
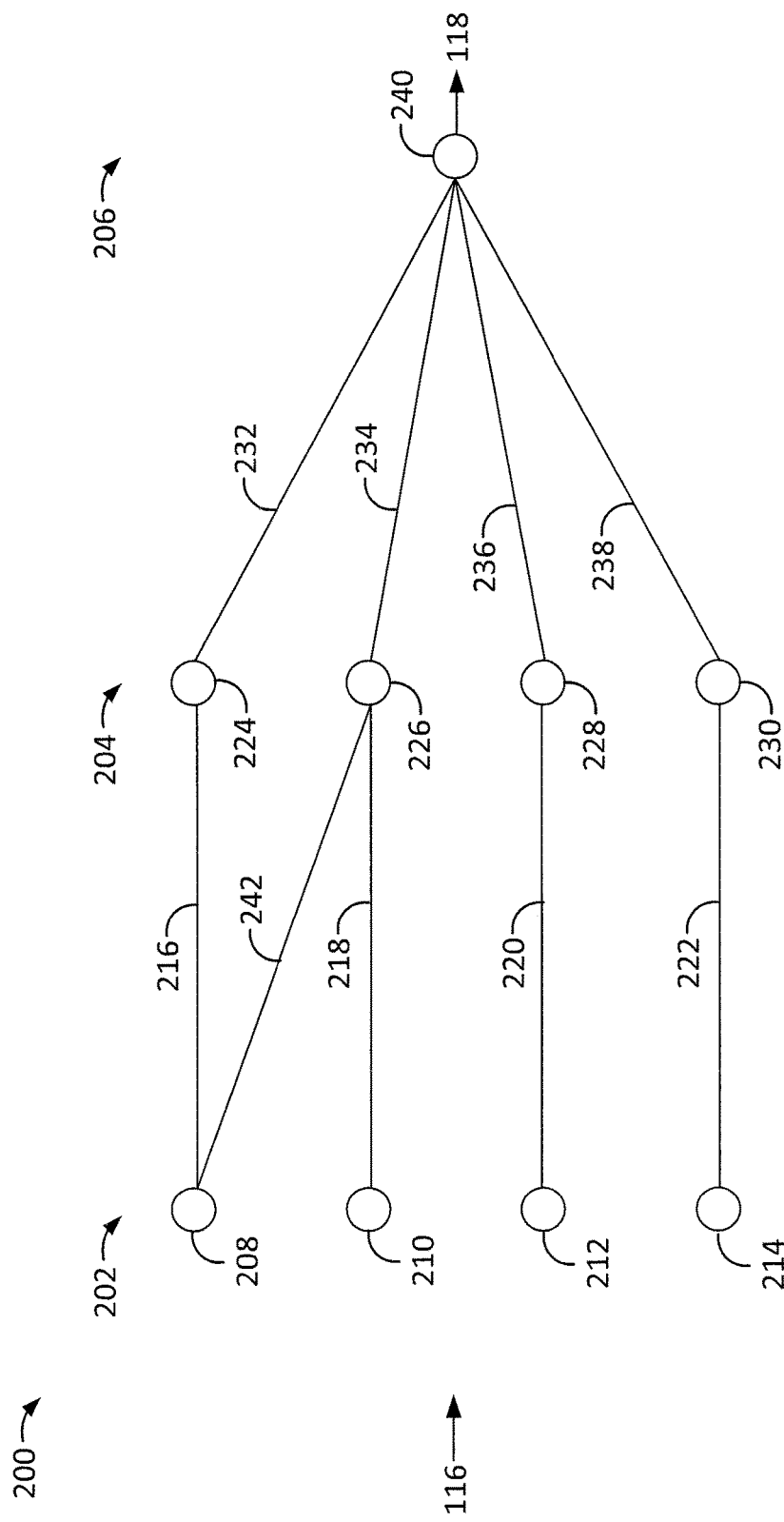
FIG. 2B illustrates an exemplary neural network with one or more additional edges, according to an embodiment.

FIG. 2B illustrates an exemplary neural network 200 with one or more additional edges, according to an embodiment. As shown, the neural network 200 in FIG. 2B includes various aspects of the neural network 200 described above in relation to FIG. 2A. In particular, the neural network 200 in FIG. 2B includes the input layer 202, the hidden layer 204, and the output layer 206. The input layer 202 includes input nodes 208-214, the hidden layer 204 includes hidden nodes 224-230, and the output layer 206 includes the output node 240. Further, the edges 216, 218, 220, and 222 may transfer data from the input nodes 208, 210, 212, and 214 to the hidden nodes 224, 226, 228, and 230, respectively. Further, the edges 232, 234, 236, and 238 may transfer data from the hidden nodes 224, 226, 228, and 230 to the output node 240.

Yet further, the neural network 200 in FIG. 2B also includes the edge 242, among other possible edges from the input nodes 208-214 to the hidden nodes 224-230. As shown, the edge 242 may transfer data and/or values from the input node 208 to the hidden node 226. The edge 242 may also be assigned a respective weight, possibly similar to the weights assigned to the edges 216-222. The respective weight assigned to the edge 242 may be the same or different than the weight assigned to the edge 216. For example, the output value, e.g., the asset value from the node 208, may be multiplied by the respective weight assigned to the edge 242 and transferred to the node 226. Further, the node 226 may be further programmed to apply one or more functions to multiple weighted values, $f_{226}$(weighted value 242, weighted value 218). As such, the one or more functions may be applied to the weighted asset value from the edge 242 and the weighted liability value from the edge 218, possibly to determine the second liability value. Notably, in this example, the second liability value may be based on multiple weighted values, include the weighted asset value from the edge 242 and the weighted liability value from the edge 218. As such, the second liability value may be multiplied by a respective weight assigned to the edge 234 and transferred to the node 240. Further, the node 240 may output the one or more results 118 according to the second weighted liability value.

Notably, additional edges may be included in the neural network 200. For example, an edge may be included between the input node 210 and the hidden node 228, an edge may be included between the input node 212 and the hidden node 230. As such, the hidden nodes 228 and 230 may apply respective functions to multiple weighted values as described above.

Figure 2C:
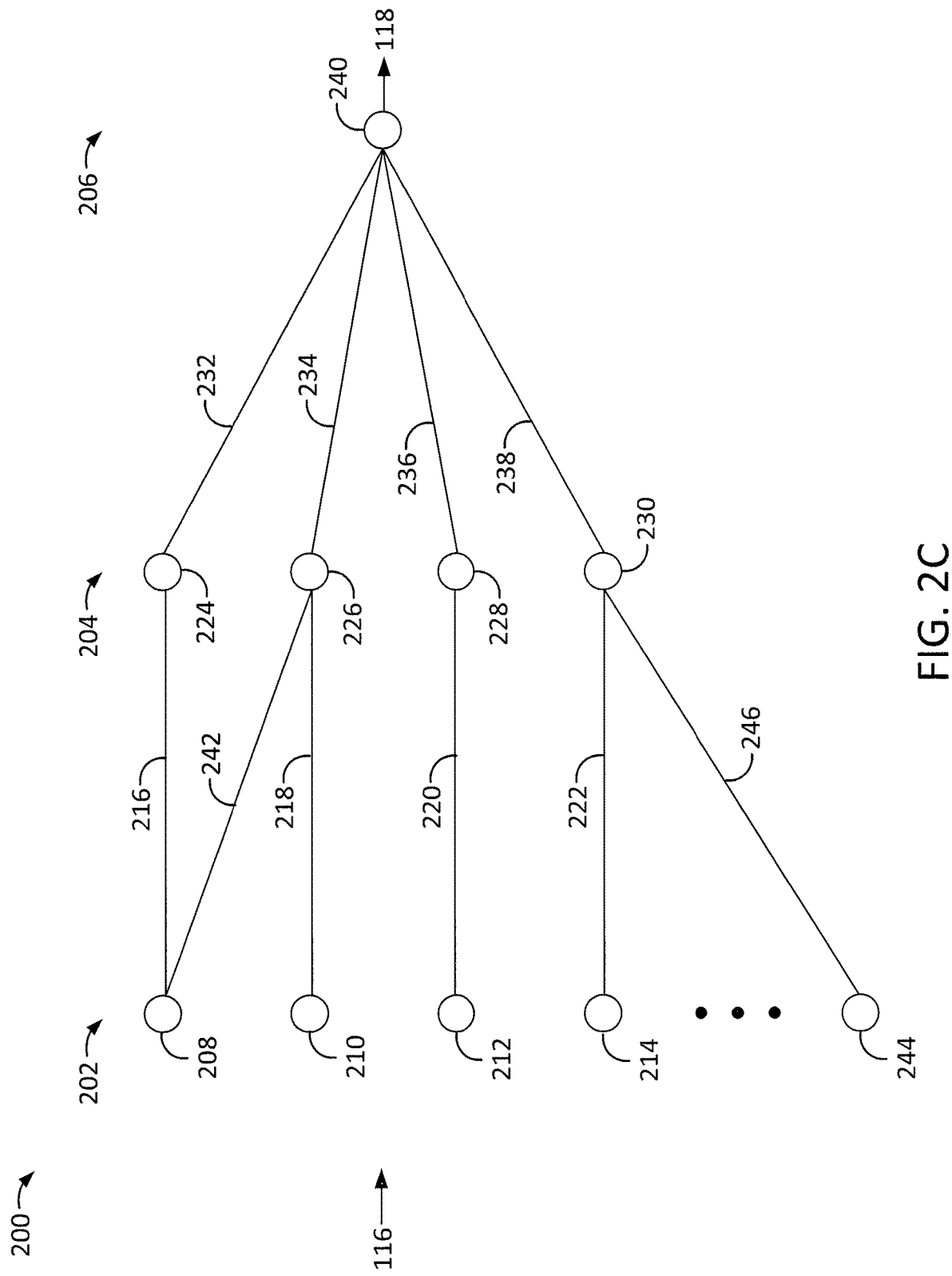
FIG. 2C illustrates an exemplary neural network with one or more additional input nodes, according to an embodiment.

FIG. 2C illustrates an exemplary neural network 200 with one or more additional input nodes, according to an embodiment. As shown, the neural network 200 in FIG. 2C includes various aspects of the neural network 200 described above in relation to FIGS. 2A and 2B. In particular, the neural network 200 in FIG. 2C includes the input layer 202, the hidden layer 204, and the output layer 206. The input layer 202 includes input nodes 208-214, the hidden layer 204 includes hidden nodes 224-230, and the output layer 206 includes the output node 240. Further, the edges 216, 218, 220, and 222 may transfer data from the input nodes 208, 210, 212, and 214 to the hidden nodes 224, 226, 228, and 230, respectively. Further, the edges 232, 234, 236, and 238 may transfer data from the hidden nodes 224, 226, 228, and 230 to the output node 240. In addition, the neural network 200 may also include the edge 242, among other possible edges included between the input nodes 208-214 and 244 to the hidden nodes 244-230.

Yet further, the neural network 200 in FIG. 2C also includes one or more additional input nodes, as shown with the ellipses and the input node 244. As noted, the input layer 202 may include as many nodes as there may be features and/or characteristics in the processed data 116. As such, the input node 244 may also be programmed to apply one or more functions, $f_{244}$(input data), to data indicating the operating income an entity, where the data may be part of the processed data 216. Further, the output value, e.g., the value associated with the operating income, from the node 244 may be multiplied by the respective assigned to the edge 246 and transferred to the node 230. Further, the node 230 may be further programmed to apply one or more functions to multiple weighted values, $f_{230}$(weighted value 222, weighted value 246). As such, the one or more functions may be applied to the weighted profit value from the edge 222 and the weighted operating income value from the edge 246, possibly to determine the second profit value. Notably, the second profit value may be based on the weighted operating income value from the edge 246. As such, the second profit value may be multiplied by a respective weight assigned to the edge 238 and transferred to the node 240. Further, the node 240 may output the one or more results 118 according to the second weighted profit value.

It should be noted that the neural network 200 in FIG. 2C may take various other forms. For example, additional input nodes represented by the ellipses may include respective input nodes for revenue and costs. In such instances, the additional input nodes may transfer weighted revenue values and weighted cost values to the node 230. Further, the node 230 may be further programmed to apply one or more functions to multiple weighted values, $f_{230}$(weighted value 222, weighted value 246, weighted revenue value, and weighted cost value). As such, the second profit value may be weighted by the edge 238 and transferred to the node 240. Thus, the node 240 may output the one or more results 118 accordingly.

Further, it should be noted that the neural network 200 in FIGS. 2A-2C may be trained in a number of ways. In some instances, the one or more results 118 may be compared with one or more expected results. Further, the neural network 200 may adjust and/or modify the weights assigned to the edges 216-222 described above in relation to FIG. 2A, the edge 242 described above in relation to FIG. 2B, and the edge 246 in relation to FIG. 2C, among other possible edges contemplated above. Yet further, the weights may be adjusted and/or modified to tune the neural network 200 such that the one or more results 118 compare or equal the one or more expected results.

Figure 3A:
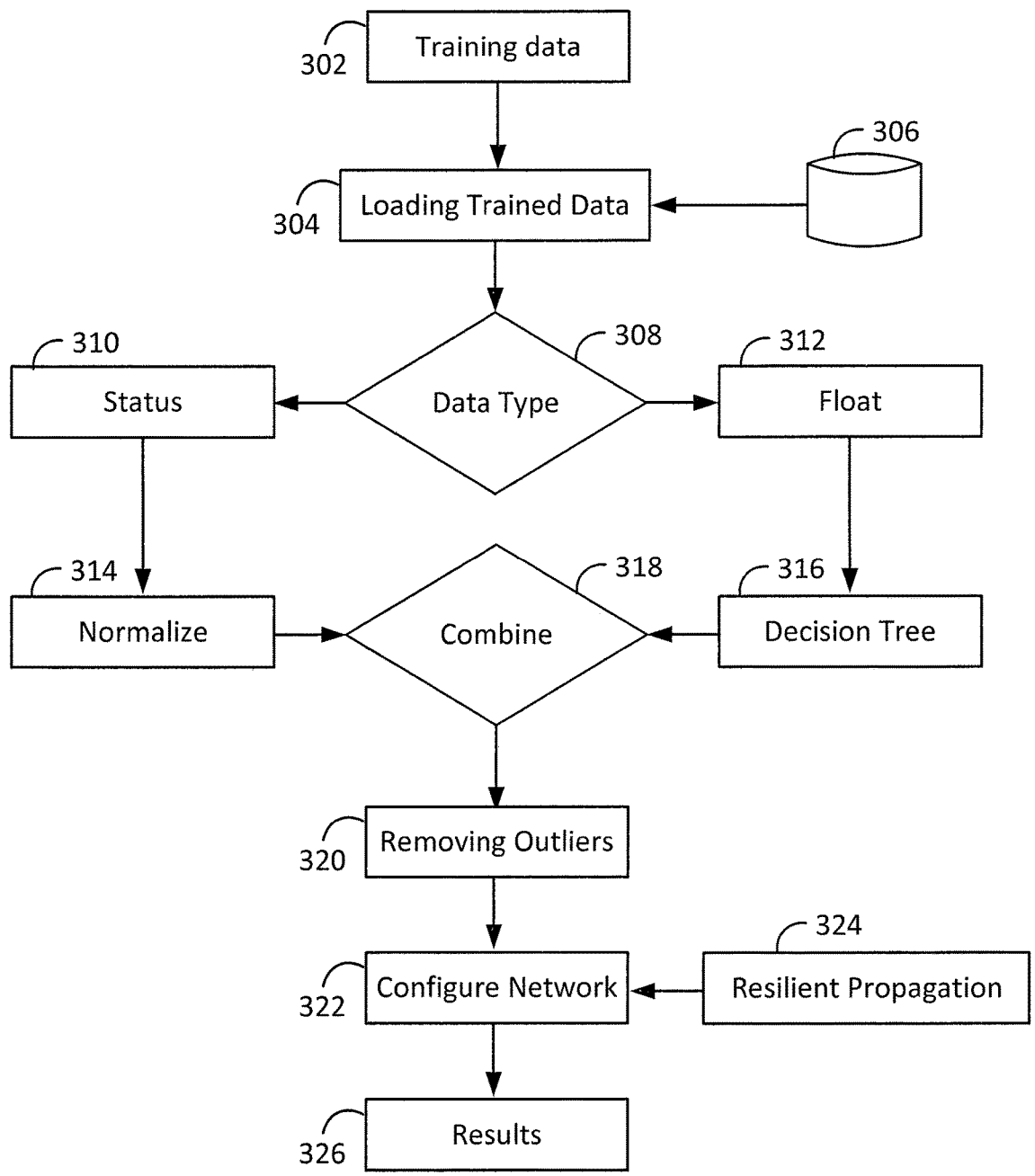
FIG. 3A illustrates an exemplary process, according to an embodiment.

FIG. 3A illustrates an exemplary process 300, according to an embodiment. Notably, one or more steps of the process 300 described herein may be omitted, performed in a different sequence, and/or combined with other processes for various types of applications contemplated herein.

At step 302, the process 300 includes training data associated with a given entity. For example, referring back to FIG. 1, the training module 104 may train the collected data 114 to provide the trained data 116, possibly also described herein as the processed data 116 and/or normalized data 116.

At step 304, the process 300 may include loading the trained data 116 associated with the given entity to the data engine 102, possibly in one or more hardware memories of the data engine 102. In some instances, additional data from the one or more databases 306 may also be loaded to the data engine 102. Further, the additional data may also be trained data associated with the given entity. As such, referring back to the scenarios above, the trained data 116 may be loaded to the data engine 102 along with the additional data from the one or more databases 306 provided with the data engine 102.

At step 308, the loaded data associated with the given entity from step 304 may be identified and separated by data type. At step 310, status data may be identified from the loaded data. The status data may indicate the statuses of accounts associated with the entity. For example, the status data may indicate statuses of the entity's bank accounts, accounts receivable, accounts payable, savings accounts, checking accounts, brokerage accounts, and/or utility accounts, among other types of accounts associated with the entity. In some instances, the status data may indicate the status of Permanent Account Number (PAN), which may be a mandatory number associated with the entity for entering into certain financial transactions. At step 314, the status data may be normalized such that the data may be represented by values, such as normalized values that may be compared, as described. Further, the data may be normalized by organizing, arranging, ordering, and/or structuring the status data, among other ways to normalize the data, as described above.

At step 312, float data may be identified from the loaded data associated with the given entity. The float data may indicate various turnover rates associated with the entity. The turnover rate may be determined over one or more periods of time. Further, the turnover rate may indicate the rate at which employees of the entity leave the entity over the one or more periods of time. Yet further, the turnover rate may indicate the rate at which the entity's inventory is reduced over the one or more periods of time, among other types of rates associated with the entity. At step 316, the float data may be transferred to a decision tree, possibly including a tree-like graph or model of decisions configured to deteii line results associated with the float data. For example, the decision tree may determine possible consequences of associating with the entity, including probabilities, potential outcomes, resource costs, and/or utilities related to associating with the entity.

At step 318, the normalized data from the step 314 and data from the decision tree 316 may be combined. At step 320, various outliers may be removed from the combined data. The outliers may be detected and removed based on deviations of the outliers from mean values associated with the combined data, as similarly described above. In particular, referring back to FIG. 1, the outliers may be removed from the combined data in a similar manner as removing the outliers from the collected data 114, as provided above.

At step 322, the neural network, e.g., the neural network 110 and/or 200, is configured. For example, referring back to FIG. 1, the neural network 110 may be configured based on transferring the combined data without the outliers from step 320 to the neural network 110. Referring back to FIGS. 2A-2C, the combined data from step 320 may be transferred to the input layer 202 of the neural network 200, where the network 200 further includes the hidden layer 204 and the output layer 206, as described above. At step 324, resilient propagation may be used to configure or optimize the neural network 200, possibly to reduce various network errors.

At step 326, one or more results may be obtained from the neural network, e.g., the neural network 110 and/or 200. For example, referring back to FIGS. 1-2C, the one or more results 118 may be obtained from the neural network 110. Referring back to FIGS. 2A-2C, the one or more results 118 may be obtained from second weighted values from the edges 232-238 and the one or more functions, such as the function described above as, $f_{240}$(second weighted values).

Figure 3B:
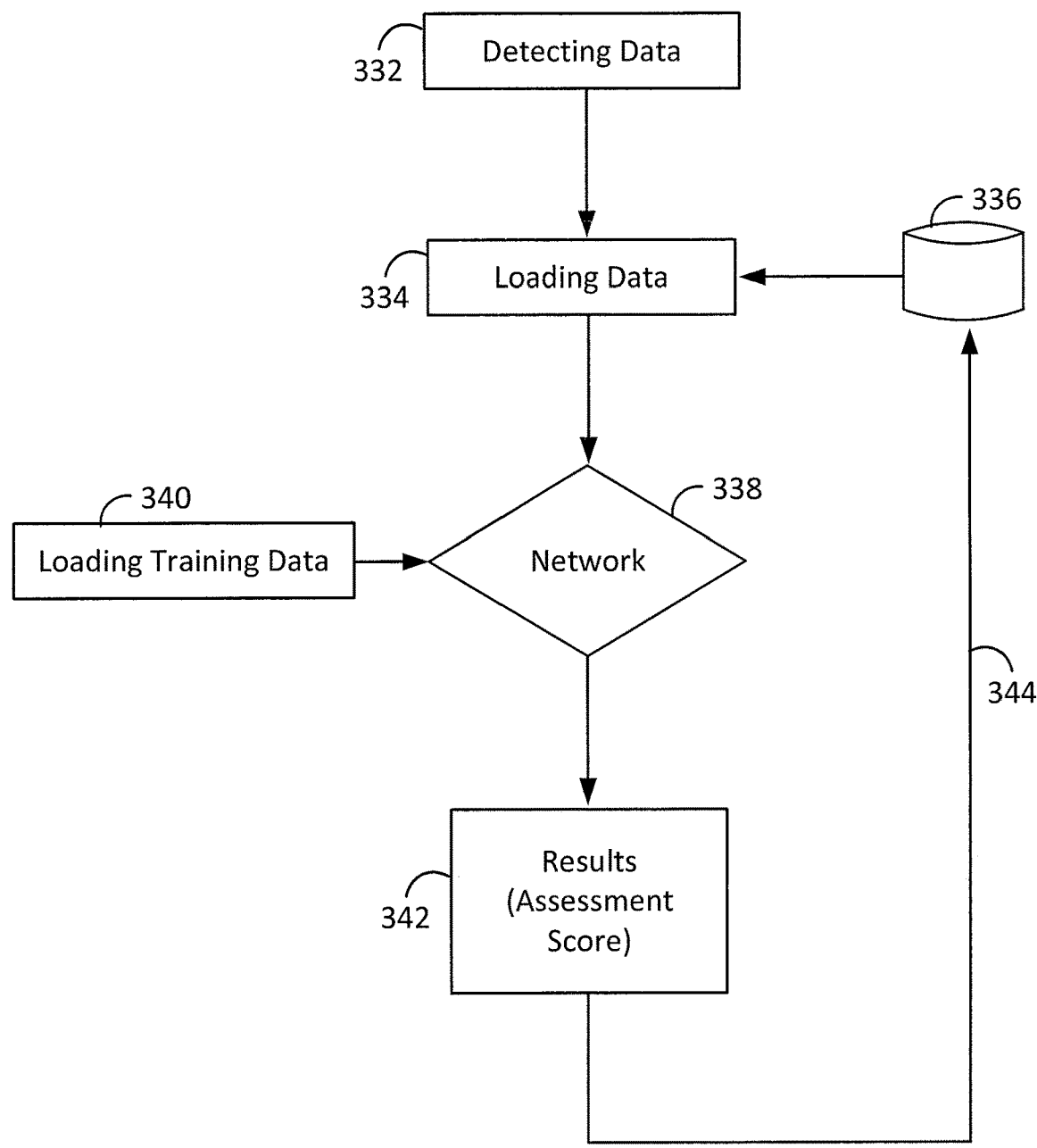
FIG. 3B illustrates an exemplary process, according to an embodiment.

FIG. 3B illustrates an exemplary process 330, according to an embodiment. Notably, one or more steps of the process 330 described herein may be omitted, performed in a different sequence, and/or combined with other processes for various types of applications contemplated herein.

At step 332, the process 330 includes detecting data associated with a given entity, possibly including one or more new forms of data. For example, referring back to FIG. 1, the working module 106 and/or the incremental training module 108 may detect the data 114 associated with the entity.

At step 334, the process 330 includes loading the detected data associated with the given entity to the data engine. For example, the detected data may be loaded to the data engine 102 and/or the working module 106. In some instances, additional data from one or more databases 334 may also be loaded to the data engine. Notably, the one or more databases 336 may take the form of the one or more databases 306 described above in relation to FIG. 3A. Further, the additional data from the one or more databases 336 may include various types of data associated with the given entity, as described further herein. Thus, the detected data 114 from the step 332 and the additional data from the one or more databases 336 may be loaded to the data engine 102, the working module 106, and/or the incremental training module 108.

At step 338, the detected data from the step 332 and the additional data from the one or more databases 336 may be transferred to a neural network. In some instances, the neural network may take various forms of the neural network 200 described above in relation to FIGS. 2A-2C. As such, the detected data 114 and the additional data from the one or more databases 336 associated with the given entity may be transferred to the neural network 200. In particular, the detected data 114 and the additional data may be transferred to the input layer 202. As noted, the neural network 200 may further include the hidden layer 204 and the output layer 206. At step 340, training data may also be loaded to the neural network 200. In some instances, the training data may be loaded as described above in relation to the step 304 of FIG. 3A. As such, the detected data, the additional data, and the trained data may be transferred to the input layer 202.

At step 342, the neural network 200 may generate one or more results. In some instances, the one or more results may take of the one or more results 118 described above in relation to FIG. 1. Further, the one or more results may include an assessment score of the given entity. In particular, the assessment score may be based on the detected data from step 332, the additional data from the one or more databases 336, and the trained data from step 340. In particular, referring back to FIGS. 2A-2C, the detected data, the additional data, and the trained data may be transferred to the input nodes 208-210, possibly such that each data set is transferred to a respective input node. Further, the assessment score may be obtained from the output node 240. As noted, the one or more assessment scores may represent an assessment of trustworthiness, dependability, credibility, creditworthiness, solvency, and/or risk, among other features or characteristics of the given entity.

At step 344, the results may be fed back to the one or more databases 336. As such, the process 330 may continue at step 334 with loading data, e.g., the results from step 342, to the data engine 102 and/or the working module 106. In some instances, referring back to step 332, the process 330 may include detecting second data associated with the given entity. At step 334, the process 330 may include loading the second detected data associated with the entity with the one or more assessment scores from step 342 fed back to the one or more databases 336. As such, at step 338, the second detected data and the one or more assessment scores may be transferred to the neural network 200 described above. Further, at step 340, the training data may also be loaded to the neural network 200. As such, at step 342, the neural network 200 may generate one or more second assessment scores.

Figure 4:
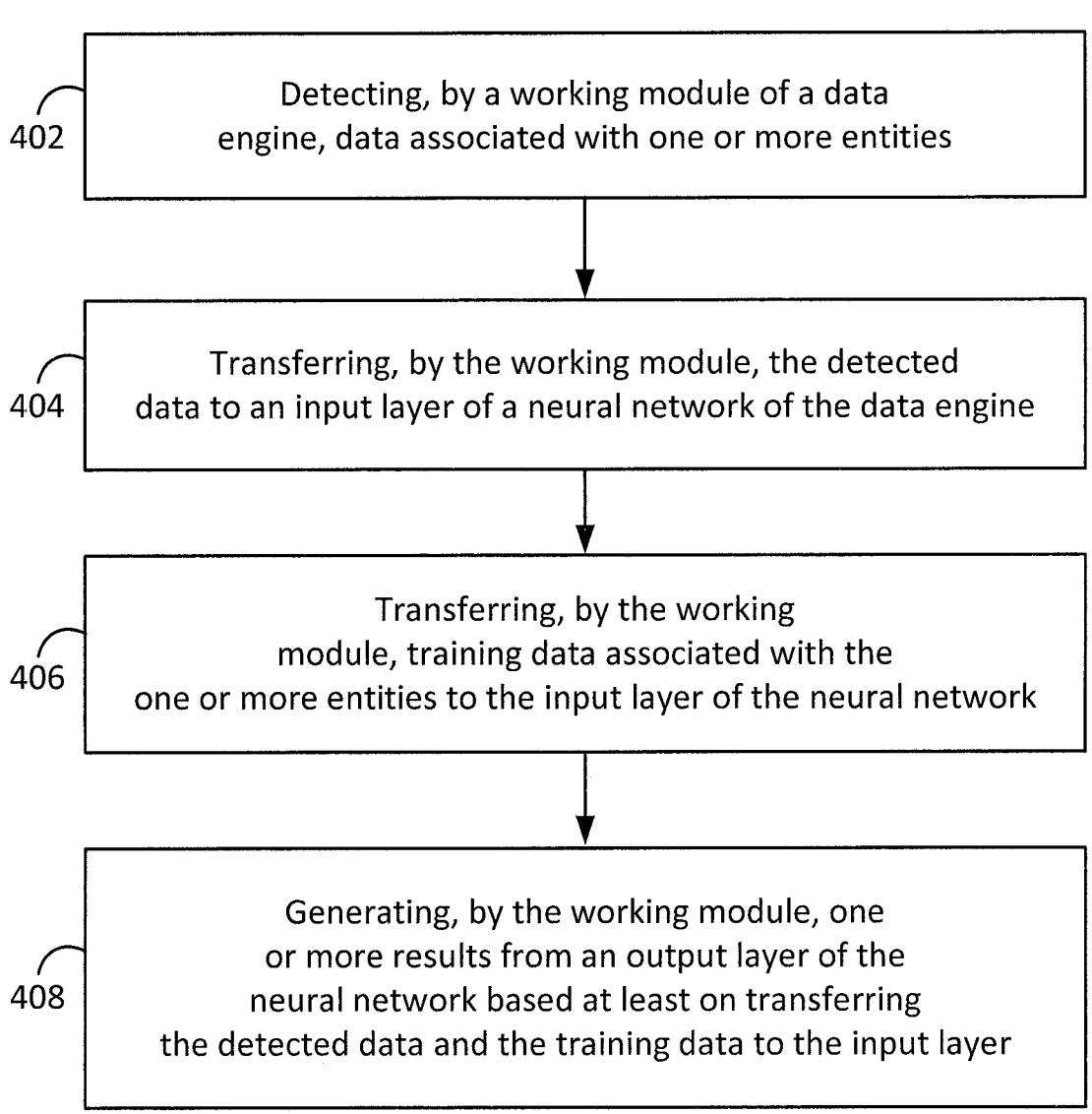
FIG. 4 illustrates an exemplary method, according to an embodiment.

FIG. 4 illustrates an exemplary method 400, according to an embodiment. Notably, one or more steps of the method 400 described herein may be omitted, performed in a different sequence, and/or combined with other methods for various types of applications contemplated herein.

At step 402, the method 400 may include detecting, by a working module of a data engine, data associated with one or more entities. The detected data may include various forms of text data, numerical data, alpha-numeric data, image data, and/or multimedia data, among various other forms of data. For example, referring back to FIG. 1, the working module 106 of the data engine 102 may detect data 114 associated with one or more entities. Further, the one or more entities may include prior entities where the neural network 110 may be configured or pre-configured with data associated such prior entities. Further, the one or more entities may include new entities where the neural network 110 may or may not be configured or pre-configured with data associated with the new entities. Yet further, referring back to the process 330 of FIG. 3B, the data 114 may be detected as described above in relation to step 332.

At step 404, the method 400 may include transferring, by the working module, the detected data to an input layer of a neural network of the data engine. For example, the working module 106 may transfer the detected data 114 to the neural network 110 of the data engine 102. Further, referring back to FIGS. 2A-2C, the detected data 114 may be transfer to the input layer 202 of the neural network 200. Yet further, referring back to the step 334 of FIG. 3B, the detected data 114 may be transferred to the input layer 202 as described above. Further, additional data or one or more assessment scores may be transferred to the input layer 202 from the one or more databases 336.

At step 406, the method 400 may include transferring, by the working module, training data associated with the one or more entities to the input layer of the neural network. For example, referring back to step 340 of FIG. 3B, the training data may be loaded to the neural network 200 and transferred to the input layer 202 of the neural network 200 as described above.

At step 408, the method 400 may include generating, by the working module, one or more results from an output layer of the neural network based at least on transferring the detected data and the training data to the input layer of the neural network. For example, the working module 106 may generate or cause the neural network 110 to generate one or more results 118. Further, the one or more results 118 may be generated from the output layer 206 of the neural network 200 based on transferring the detected data and the training data to the input layer 202. Yet further, the one or more results may include one or more assessment scores associated with the one or more entities as described above in relation to step 342 of FIG. 3B.

Notably, referring back to step 344 of FIG. 3B, the one or more results and/or the assessment scores may be fed back to the database 336. As such, the method 400 may include transferring the one or more results 118 to the input layer 202 of the neural network 202. Further, the method 400 may include generating, by the working module, one or more second results from the output layer 204 based at least on the one or more results 118 being transferred to the input layer 202.

As noted, the neural network 200 further includes the hidden layer 204. Thus, the method 400 may further include transferring the detected data 114 and the training data, e.g., from the step 340, from the input layer 202 through the hidden layer 204 to the output layer 206. As such, the one or more results 118 may be generated based at least on transferring the detected data 114 and the training data 340 through the hidden layer 204 to the output layer 206. As further described above, the neural network 200 includes a number of nodes 208-214, 224-230, and 240, among other possible nodes, such as the node 244 described above. As such, the one or more results 118 may be generated based on one or more functions of each node, $f_{node}(data)$, applied to the detected data 114 and the training data 340 transferred to the input layer 202.

As noted, the neural network 200 includes a number of nodes 208-214, 224-230, and 240, among other possible nodes, such as the node 244 described above. As further described above, each pair of nodes includes a respective edge with a respective weight. As such, the one or more results is generated based at least on one or more functions of each node, $f_{node}$(data), with the respective weight applied to the detected data and the training data 340 being transferred to the input layer 202.

In some embodiments, each node of a number of nodes 224-230 from the hidden layer 204 of the neural network 200 may correspond to a respective threshold value. As such, the method 400 may include determining a respective output from each node from the number of nodes 224-230. Further, the method 400 may include determining the respective output meets or exceeds the respective threshold value associated with each node. For example, the respective output meeting or exceeding the respective threshold may be determined based on the one or more functions, $f_{224}$(weighted value), $f_{226}$(weighted value), $f_{228}$(weighted value), and $f_{230}$(weighted value) applied. Yet further, the method 400 may include, in response to the respective output meeting or exceeding the respective threshold value, causing the respective output to flow out of the node.

Using the systems and processes described herein, an assessment score of one or more entities may be generated. For example, the assessment score may be a credit score of the one or more entities, such as a given company. Further, the assessment score may indicate the trustworthiness, dependability, credibility, creditworthiness, solvency, and/or risk, among other features and/or characteristics of the company. The assessment score may range from a scale of 0-1000, by assessing the company's credentials and comparing the credential with other entities or companies. The assessment score may help other entities determine whether to associate with the given company. For example, an emerging company in the business-to-business with a number of stakeholders may benefit from being able to generate such assessment scores. By generating multiple assessment scores for a number of companies, the emerging company can determine whether to associate with one or more of the companies assessed.

Figure 5:
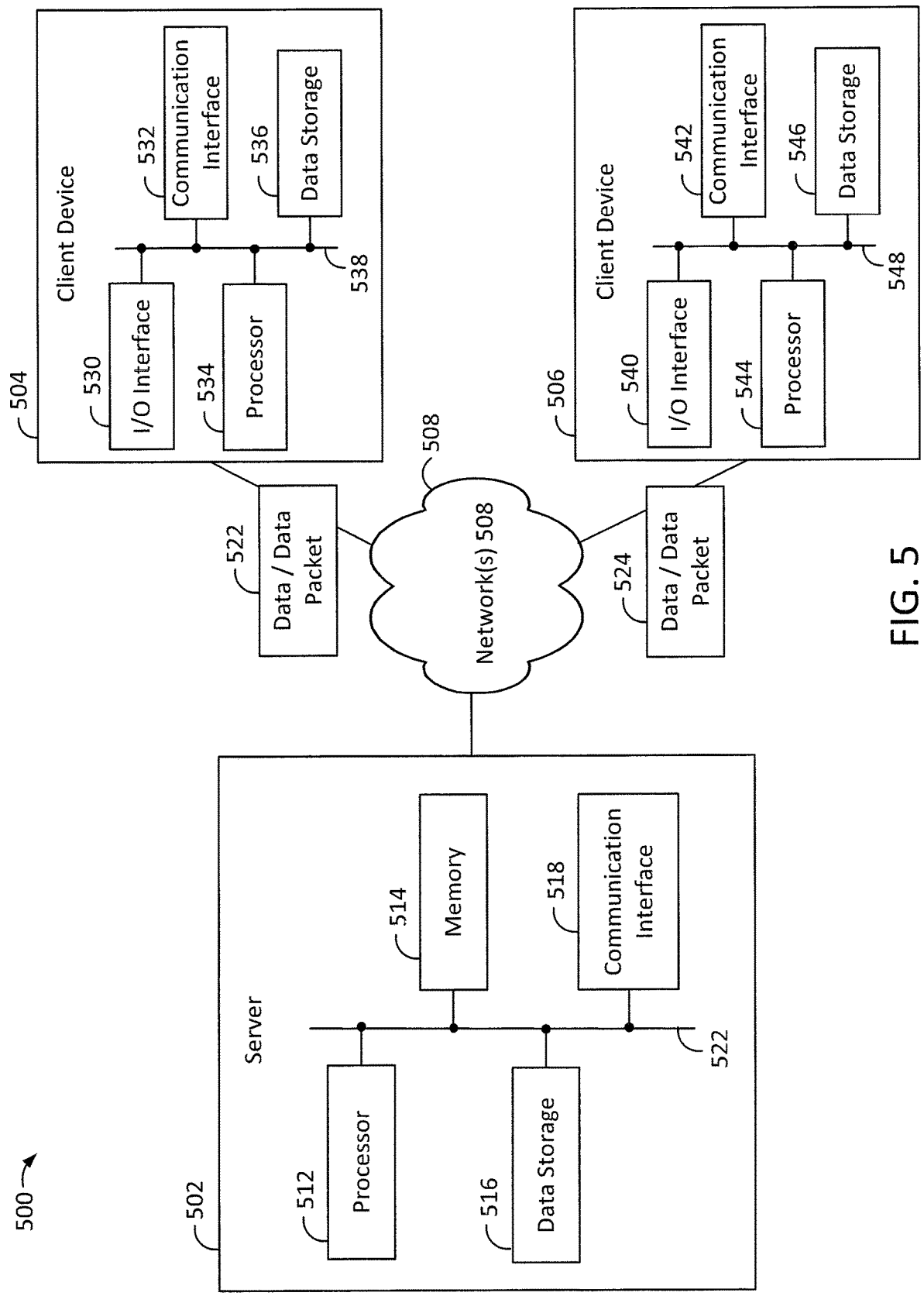
FIG. 5 is a block diagram of an exemplary system, according to an embodiment.

FIG. 5 is a simplified block diagram of an exemplary system 500, according to an embodiment. The system 500 may include the system 100 described above in relation to FIG. 1 and the neural network 200 described above in relation to FIGS. 2A-2C. For example, as shown in FIG. 5, the system 500 includes the server 502. The server 502 may take the form of the data engine 102 such that the server 502 also includes the training module 104, the working module 106, the incremental training module 108, and/or the neural network 110 described above. The server 500 may be configured to perform operations of a service provider, such as PayPal, Inc. of San Jose, Calif., USA. Further, the system 500 may also include client device 504 and the client device 506. As such, the server 502 and the client devices 504 and 506 may be configured to communicate over the one or more communication networks 508. As shown, the system 500 includes multiple computing devices but may also include other possible computing devices as well.

The system 500 may operate with more or less than the computing devices shown in FIG. 5, where each device may be configured to communicate over the one or more communication networks 508, possibly to transfer data accordingly. In some instances, the one or more communication networks 508 may include a data network, a telecommunications network, such as a cellular network, among other possible networks. In some instances, the communication network 508 may include web servers, network adapters, switches, routers, network nodes, base stations, microcells, and/or various buffers/queues to transfer data/data packets 522 and/or 524.

The data/data packets 522 and/or 524 may include the various forms of data associated with the one or more entities described above. The data/data packets 522 and/or 524 may be transferrable using communication protocols such as packet layer protocols, packet ensemble layer protocols, and/or network layer protocols, among other protocols and/or communication practices. For example, the data/data packets 522 and/or 524 may be transferrable using transmission control protocols and/or internet protocols (TCP/IP). In various embodiments, each of the data/data packets 522 and 524 may be assembled or disassembled into larger or smaller packets of varying sizes, such as sizes from 5,000 to 5,500 bytes, for example, among other possible data sizes. As such, data/data packets 522 and/or 524 may be transferrable over the one or more networks 508 and to various locations in the data infrastructure 500.

In some embodiments, the server 502 may take a variety of forms. The server 502 may be an enterprise server, possibly operable with one or more operating systems to facilitate the scalability of the data infrastructure 500. For example, the server 502 may operate with a Unix-based operating system configured to integrate with a growing number of other servers, client devices 504 and/or 506, and other networks 508 over the system architecture 500. The server 502 may further facilitate workloads associated with numerous data transfers in view of an increasing number of entity requests, e.g., user requests, to determine assessment scores. In particular, the server 502 may facilitate the scalability relative to such increasing number of requests to eliminate data congestion, bottlenecks, and/or transfer delays.

In some embodiments, the server 502 may include multiple components, such as one or more hardware processors 512, non-transitory memories 514, non-transitory data storages 516, and/or communication interfaces 518, among other possible components described above in FIG. 1, any of which may be communicatively linked via a system bus, network, or other connection mechanism 520. The one or more hardware processors 512 may take the form of a multi-purpose processor, a microprocessor, a special purpose processor, a digital signal processor (DSP) and/or other types of processing components. For example, the one or more hardware processors 512 may include an application specific integrated circuit (ASIC), a programmable system-on-chip (SOC), and/or a field-programmable gate array (FPGA). In particular, the one or more hardware processors 512 may include a variable-bit (e.g., 64-bit) processor architecture configured for generating one or more results with the neural networks described above. As such, the one or more hardware processors 512 may execute varying instructions sets (e.g., simplified and complex instructions sets) with fewer cycles per instruction than other general-purpose hardware processors to improve the performance of the server 502.

In practice, for example, the one or more hardware processors 512 may be configured to read instructions from the non-transitory memory component 514 to cause the system 500 to perform operations. Referring back to FIG. 1, the operations may include collecting, by the training module 104 of the data engine 102, data 114 associated with one or more entities, where the data 114 includes textual data. The operations may also include processing, by the training module 104, the data 114 associated with the one or more entities such that the textual data is converted to numerical data. The operations may include removing, by the training module 104, one or more outliers from the processed data 116 based on a deviation of the one or more outliers from one or more mean values of the processed data 116. In response to removing the one or more outliers, the operations may include configuring the neural network 110 with a transfer of the processed data 116 to the input layer of the neural network 110. The operations may also include generating, by the working module 106 of the data engine 102, one or more results from the output layer of the neural network 110 based at least on the transfer of the processed data 116 to the input layer.

The non-transitory memory component 514 and/or the non-transitory data storage 516 may include one or more volatile, non-volatile, and/or replaceable storage components, such as magnetic, optical, and/or flash storage that may be integrated in whole or in part with the one or more hardware processors 512. Further, the memory component 514 may include or take the form of a non-transitory computer-readable storage medium, having stored thereon computer-readable instructions that, when executed by the hardware processing component 512, cause the server 502 to perform operations described above and also those described in this disclosure, illustrated by the accompanying figures, and/or otherwise contemplated herein.

The communication interface component 518 may take a variety of forms and may be configured to allow the server 502 to communicate with one or more devices, such as the client devices 504 and/or 506. For example, the communication interface 518 may include a transceiver that enables the server 502 to communicate with the client devices 504 and/or 506 via the one or more communication networks 508. Further, the communication interface 518 may include a wired interface, such as an Ethernet interface, to communicate with the client devices 504 and/or 506. Yet further, the communication interface 518 may include a wireless interface, a cellular interface, a Global System for Mobile Communications (GSM) interface, a Code Division Multiple Access (CDMA) interface, and/or a Time Division Multiple Access (TDMA) interface, among other types of cellular interfaces. In addition, the communication interface 518 may include a wireless local area network interface such as a WI-FI interface configured to communicate with a number of different protocols. As such, the communication interface 518 may include a wireless interface operable to transfer data over short distances utilizing short-wavelength radio waves in approximately the 2.4 to 2.485 GHz range. In some instances, the communication interface 518 may send/receive data or data packets 522 and/or 524 to/from client devices 504 and/or 506.

The client devices 504 and 506 may also be configured to perform a variety of operations such as those described in this disclosure, illustrated by the accompanying figures, and/or otherwise contemplated herein. In particular, the client devices 504 and 506 may be configured to transfer data/data packets 522 and/or 524 with the server 502, that include data associated with one or more entities. The data/data packets 522 and/or 524 may also include location data such as Global Positioning System (GPS) data or GPS coordinate data, triangulation data, beacon data, WI-FI data, peer data, social media data, sensor data, movement data, temperature data, asset data, liability data, banking statement data, revenue data, cost data, profit data, age data of companies, data of the number of employees of the companies, among other data related to possible characteristics of the companies, and/or other types of data described or contemplated herein.

In some embodiments, the client devices 504 and 506 may include or take the form of a smartphone system, a personal computer (PC) such as a laptop device, a tablet computer device, a wearable computer device, a head-mountable display (HMD) device, a smart watch device, and/or other types of computing devices configured to transfer data. The client devices 504 and 506 may include various components, including, for example, input/output (I/O) interfaces 530 and 540, communication interfaces 532 and 542, hardware processors 534 and 544, and non-transitory data storages 536 and 546, respectively, all of which may be communicatively linked with each other via a system bus, network, or other connection mechanisms 538 and 548, respectively.

The I/O interfaces 530 and 540 may be configured to receive inputs from and provide outputs to one or more entities, e.g., users, of the client devices 504 and 506. For example, the I/O interface 530 may include a display that renders a graphical user interface (GUI) configured to receive an input that indicates an entity request, e.g., a user request, to determine an assessment score. Thus, the I/O interfaces 530 and 540 may include displays and/or other input hardware with tangible surfaces such as touchscreens with touch sensitive sensors and/or proximity sensors. The I/O interfaces 530 and 540 may also be synched with a microphone configured to receive voice commands, a computer mouse, a keyboard, and/or other input mechanisms. In addition, I/O interfaces 530 and 540 may include output hardware, such as one or more touchscreen displays, sound speakers, other audio output mechanisms, haptic feedback systems, and/or other hardware components.

In some embodiments, communication interfaces 532 and 542 may include or take a variety of forms. For example, communication interfaces 532 and 542 may be configured to allow client devices 504 and 506, respectively, to communicate with one or more devices according to a number of protocols described or contemplated herein. For instance, communication interfaces 532 and 542 may be configured to allow client devices 504 and 506, respectively, to communicate with the server 502 via the communication network 508. The processors 534 and 544 may include one or more multi-purpose processors, microprocessors, special purpose processors, digital signal processors (DSP), application specific integrated circuits (ASIC), programmable system-on-chips (SOC), field-programmable gate arrays (FPGA), and/or other types of processing components.

The data storages 536 and 546 may include one or more volatile, non-volatile, removable, and/or non-removable storage components, and may be integrated in whole or in part with processors 534 and 544, respectively. Further, data storages 536 and 546 may include or take the form of non-transitory computer-readable mediums, having stored thereon instructions that, when executed by processors 534 and 544, cause the client devices 504 and 506 to perform operations, respectively, such as those described in this disclosure, illustrated by the accompanying figures, and/or otherwise contemplated herein.

In some embodiments, the one or more communication networks 508 may be used to transfer data between the server 502, the client device 504, the client device 506, and/or other computing devices associated with the data infrastructure 500. The one or more communication networks 508 may include a packet-switched network configured to provide digital networking communications and/or exchange data of various forms, content, type, and/or structure. The communication network 508 may include a data network such as a private network, a local area network, and/or a wide area network. Further, the communication network 508 may include a cellular network with one or more base stations and/or cellular networks of various sizes.

In some embodiments, the client device 504 may generate an entity request, e.g., a user request, to determine an assessment score of the entity, e.g., the user. For example, the request may be encoded in the data/data packet 522 to establish a connection with the server 502. As such, the request may initiate a search of an internet protocol (IP) address of the server 502 that may take the form of the IP address, "192.168.1.102," for example. In some instances, an intermediate server, e.g., a domain name server (DNS) and/or a web server, possibly in the one or more networks 508 may identify the IP address of the server 502 to establish the connection between the client device 504 and the server 502. As such, the server 502 may generate an assessment score of the entity or user, possibly based on the data/data packet 522 exchanged.

It can be appreciated that the server 502 and the client devices 504 and/or 506 may be deployed in various other ways. For example, the operations performed by the server 502 and/or the client devices 504 and 506 may be performed by a greater or a fewer number of devices. Further, the operations performed by two or more of the devices 502, 504, and/or 506 may be combined and performed by a single device. Yet further, the operations performed by a single device may be separated or distributed among the server 502 and the client devices 504 and/or 506. In addition, it should be noted that the client devices 504 and/or 506 may be operated and/or maintained by the same entities, e.g., users. Yet further, the client devices 504 and/or 506 may be operated and/or maintained by different entities such that each client device 504 and/or 506 may be associated with one or more accounts.

Notably, one or more accounts may be displayed on the client device 504, possibly through I/O interface 530. Thus, the account may be displayed on a smartphone system and/or any of the devices described or contemplated herein to access the account. For example, an entity, e.g., a user, may manage one or more of their accounts on the client device 504. In particular, the entity may view an account and an assessment score of the entity based on the data associated with the account.

In some embodiments, referring back to FIG. 1, the collected data 114 associated with the one or more entities may include credibility data that indicates a level of credibility associated with the one or more entities, such as a level ranging from highly credible to mildly credible, mildly credible to low credibility, and/or no credibility. Further, the collected data 114 may include asset data that indicates a number of assets of the one or more entities, as described herein. Yet further, the collected data 114 may include feature data that indicates a number of features associated with the one or more entities, such as trustworthiness, dependability, creditworthiness, solvency, and/or risk associated with the one or more entities.

Referring back to FIG. 1 again, the operations performed by the one or more hardware processors 512 may include removing, by the training module 104, one or more outliers from the processed data 116 based on a deviation of the one or more outliers from one or more mean values of the processed data 116. Further, as described above in relation to FIGS. 2A-2C, the neural network 200 further includes the hidden layer 204. In some embodiments, the operations may include transferring the processed data 116 from the hidden layer 204 to the output layer 206, where the one or more results 118 is generated based on transferring the processed data 116 from the hidden layer 204 to the output layer 206.

In some embodiments, the neural network 200 includes a number of the nodes 208-214, 224-230, and 240. In some instances, each pair of nodes may include 208 and 224, 210 and 226, 212 and 228, 214 and 230, 224 and 240, 226 and 240, 228 and 240, 230 and 240, among other possible pairs. In some instances, each pair of nodes may include a respective edge, such as the edge 216 between nodes 208 and 224, the edge 218 between nodes 210 and 226, the edge 220 between nodes 212 and 228, the edge 222 between nodes 214 and 230, the edge 232 between nodes 224 and 240, the edge 234 between nodes 226 and 240, the edge 236 between nodes 228 and 240, and the edge 238 between 230 and 240, among other possible edges 232 and 246 described above. As noted, each respective edge may carry a respective weight such that a respective output flowing through the respective node is multiplied by the respective weight.

In some embodiments, each node of a number of nodes 208-244, 224-230, and 240 from the neural network 200 corresponds to a respective threshold value, as described herein. In some instances, the operations performed by the one or more hardware processors 512 may include determining a respective output from each node from the number of nodes 208-244, 224-230, and 240. Further, the operations performed may include determining the respective output meets or exceeds the respective threshold value associated with each node. Further, in response to the respective output meeting or exceeding the respective threshold value, the operations may include determining whether to cause the respective output to flow out of each node.

In some embodiments, the one or more results includes an assessment score associated with the one or more entities. Further, the operations performed by the one or more hardware processors 512 may include determining an error value based at least on the assessment score and an expected score. Yet further, the operations may include determining whether the neural network 200 is configured for production based at least on the error value in comparison with a tolerance limit.

In some embodiments, the operations performed by the one or more hardware processors 512 may include determining a given sample from a number of samples associated with the collected data 114. For example, the one or more mean values may correspond to the number of samples. Further, the operations may include determining a number of samples from the plurality of samples and a standard deviation ("stdv") of the number of samples, as described herein. Yet further, the operations may include detecting the one or more outliers based on the given sample, the one or more mean values (the "mean"), the number of samples ("n"), and the standard deviation ("stdv"), where the one or more outliers may be removed based on detecting the one or more outliers. As noted, the outliers may be detected using the formula or function below:

if (sample (x)−mean)>number of samples (n)*stdv, then sample (x) is an outlier

As shown above, the one or more outliers may be removed based on a determination whether the given sample minus the one or more mean values is greater than the number of samples multiplied by the standard deviation.

Further, it should be noted an entity account, e.g., a user account, may take a number of different forms. For example, the entity account may include a compilation of data associated with a given entity. For example, an account for a particular entity may include data related to the entity's interest. Some examples of accounts may include accounts with service providers described above and/or other types of accounts with funds, balances, and/or check-outs, such as e-commerce related accounts. Further, accounts may also include social networking accounts, email accounts, smartphone accounts, music playlist accounts, video streaming accounts, among other possibilities. Further, the entity may provide various types of data to the account via the client device 104.

In some embodiments, an entity may have a single account with a given service provider that may represent the entity for multiple other service providers, applications, and/or services, among other possibilities. For example, the single account may represent the entity for e-mail accounts, social networking accounts, smartphone accounts, as well as websites, applications, and/or other services. As such, entity could opt to use the single account as a multi-purpose account for performing various operations, including generating requests to determine one or more assessment scores related to the single account.

In some embodiments, an account may be created for one or more entities. In some instances, the account may be a corporate account, where employees, staff, worker personnel, and/or contractors, among other individuals may have access to the corporate account. Yet further, it should be noted that an entity, as described herein, may be a company, a partnership, a number of individuals or even a robot, a robotic system, a computing device, a computing system, and/or another form of technology capable of transferring data corresponding to the account. The entity may be required to provide a login, a password, a code, an encryption key, authentication data, and/or other types of data to access to the account. Further, an account may be a family account created for multiple family members, where each member may have access to the account.

Figure 6A:
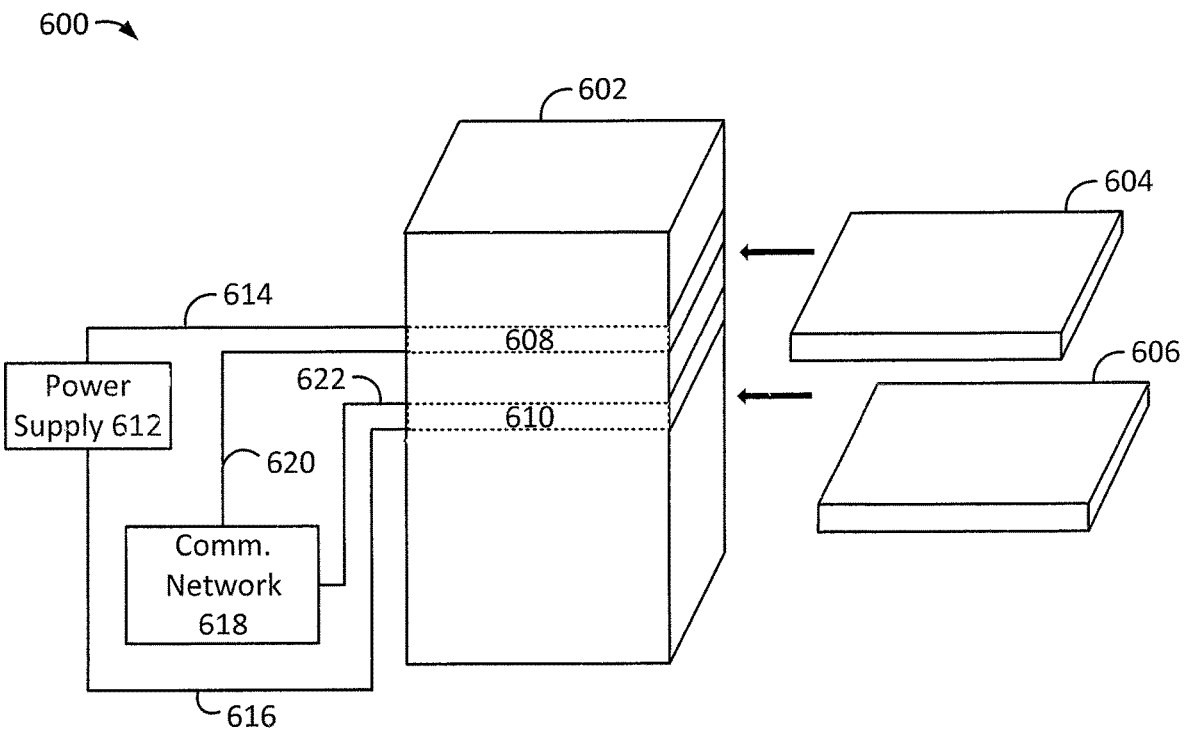
FIG. 6A illustrates an exemplary system configured to support a set of trays, according to an embodiment.

FIG. 6A illustrates exemplary system 600 configured to support a set of trays 604 and 606, according to an embodiment. The system 600 may, for example, include or take the form of the server 502 described above in relation to FIG. 5, possibly including the data engine 102 described in relation to FIG. 1. In particular, the system 600 may also be referred to as the server or server system 600. As such, the server system 600 may receive requests from numerous client devices, such as the client devices 504 and/or 506, to generate assessment scores of entities. The system 600 may further support, operate, run, and/or manage the applications, websites, platforms, and/or other compilations of data to generate assessment score for numerous entities.

As shown, the system 600 may include a chassis 602 that may support trays 604 and 606, possibly also referred to as servers or server trays 604 and/or 606. Notably, the chassis 602 may support multiple other trays as well. The chassis 602 may include slots 608 and 610, among other possible slots, configured to hold or support trays 604 and 606, respectively. For example, the tray 604 may be inserted into the slot 608 and the tray 606 may be inserted into the slot 610. Yet, the slots 608 and 610 may be configured to hold the trays 604 and 606 interchangeably such that the slot 608 may be configured to hold the tray 606 and the slot 610 may be configured to hold the tray 604.

Further, the chassis 602 may be connected to a power supply 612 via connections 614 and 616 to provide power to the slots 608 and 610, respectively. The chassis 602 may also be connected to the communication network 618 via connections 620 and 622 to provide network connectivity to the slots 608 and 610, respectively. As such, trays 604 and 606 may be inserted into slots 608 and 610, respectively, and power supply 612 may supply power to trays 604 and 606 via connections 614 and 616, respectively. Further, trays 604 and 606 may be inserted into the slots 610 and 608, respectively, and power supply 612 may supply power to trays 604 and 606 via connections 616 and 614, respectively.

Yet further, trays 604 and 606 may be inserted into slots 608 and 610, respectively, and communication network 618 may provide network connectivity to trays 604 and 606 via connections 620 and 622, respectively. In addition, trays 604 and 606 may be inserted into slots 610 and 608, respectively, and communication network 618 may provide network connectivity to trays 604 and 606 via connections 622 and 620, respectively. The communication network 618 may, for example, take the form of the one or more communication networks 508, possibly including one or more of a data network and a cellular network. In some embodiments, the communication network 618 may provide a network port, a hub, a switch, or a router that may be connected to an Ethernet link, an optical communication link, a telephone link, among other possibilities.

In practice, the tray 604 may be inserted into the slot 608 and the tray 606 may be inserted into the slot 610. During operation, the trays 604 and 606 may be removed from the slots 608 and 610, respectively. Further, the tray 604 may be inserted into the slot 610 and the tray 606 may be inserted into the slot 608, and the system 600 may continue operating, possibly based on various data buffering mechanisms of the system 600. Thus, the capabilities of the trays 604 and 606 may facilitate uptime and the availability of the system 600 beyond that of traditional or general servers that are required to run without interruptions. As such, the server trays 604 and/or 606 facilitate fault-tolerant capabilities of the server system 600 to further extend times of operation. In some instances, the server trays 604 and/or 606 may include specialized hardware, such as hot-swappable hard drives, that may be replaced in the server trays 604 and/or 606 during operation. As such, the server trays 604 and/or 606 may reduce or eliminate interruptions to further increase uptime.

Figure 6B:
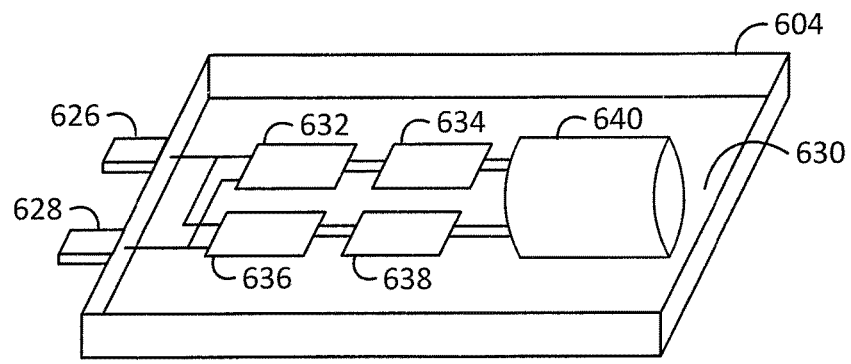
FIG. 6B illustrates an exemplary tray configured to support one or more components, according to an embodiment.

FIG. 6B illustrates an exemplary tray 604 configured to support one or more components, according to an embodiment. The tray 604, possibly also referred to as the server tray 604, may take the form of the tray 604 described in relation to FIG. 6A. Further, the tray 606 may also take the form of the tray 604. As shown, the tray 604 may include a tray base 630 that may include the bottom surface of the tray 604. The tray base 630 may be configured to support multiple components such as the hard drives described above and a main computing board connecting one or more components 632-640. The tray 604 may include a connection 626 that may link to the connections 614 or 616 to supply power to the tray 604. The tray 604 may also include a connection 628 that may link to the connections 620 or 622 to provide network connectivity to the tray 604. The connections 626 and 628 may be positioned on the tray 604 such that upon inserting the tray 604 into the slot 608, the connections 626 and 628 couple directly with the connections 614 and 620, respectively. Further, upon inserting the tray 604 into the slot 610, the connections 626 and 628 may couple directly with connections 616 and 622, respectively.

In some embodiments, the tray 604 may include a processor component 632, a memory component 634, a data storage component 636, a communication component and/or interface 638, that may, for example, take the form of the hardware processor 512, the non-transitory memory 514, the non-transitory data storage 516, and the communication interface 518, respectively. Further, the tray 604 may include the data engine component 640 that may take the form of the data engine 102. In particular, the data engine component 640 may include the training module 104, the working module 106, the incremental training module 108, and/or the neural network 110 that takes the form of the neural network 200.

As shown, the connections 626 and 628 may be configured to provide power and network connectivity, respectively, to each of the components 632-640. In some embodiments, one or more of the components 632-640 may perform operations described herein, illustrated by the accompanying figures, and/or otherwise contemplated. In some embodiments, the components 632-640 may execute instructions on a non-transitory, computer-readable medium to cause the system 600 to perform such operations.

As shown, the processor component 632 may take the form of a multi-purpose processor, a microprocessor, a special purpose processor, a digital signal processor (DSP). Yet further, the processor component 632 may take the form of an application specific integrated circuit (ASIC), a programmable system on chip (PSOC), field-programmable gate array (FPGA), and/or other types of processing components. For example, the processor component 632 may be configured to receive a request for an assessment score based on an input to a graphical user interface of a client device, such as the client device 104.

The data engine 640 may perform a number of operations. As noted, the data engine 640 may include a training module and a working module, such as the training module 104 and the working module 106, respectively. The operations may include loading, by the training module 104, data 114 associated with one or more entities. The operations may include normalizing, by the training module 104, the data 114 associated with the one or more entities. The operations may include removing, by the training module 104, one or more outliers from the normalized data 116 based on a deviation of the one or more outliers from one or more mean values of the normalized data 116. In response to removing the one or more outliers, the operations may include configuring the neural network 110. As noted, the neural network 110 may take the form of the neural network 200. As such, the neural network 200 may be configured with a transfer of the normalized data 110 to the input layer 202 of the neural network 200. The operations may include generating, by a working module of the data engine, one or more results from the output layer 206 of the neural network 200 based on the transfer of the normalized data 116 to the input layer 202.

In some embodiments, the processor component 632 may be configured with a Unix-based operating system, possibly to support scalability with various other servers and/or data infrastructures. In particular, the processor component 632 may be configured to be scalable with other servers of various forms that may, for example, include server trays, blades, and/or cartridges similar to the server trays 604 and/or 606. In some instances, the processor component 632 may be configured with scalable process architectures, including, reduced instruction set architectures. In some instances, the processor component 632 may be compatible with various legacy systems such that the processor component 632 may receive, read, and/or execute instruction sets with legacy formats and/or structures. As such, the processor component 632 generally has capabilities beyond that of traditional or general-purpose processors.

The database engine component 640 may also include one or more secure databases to track numerous entity accounts. For example, the database engine component 640 may include secured databases to detect data associated with the entity accounts, as described in step 332 of FIG. 3B and step 402 of FIG. 4. In particular, the database engine component 640 may perform searches based on numerous queries, search multiple databases in parallel, and detect the data simultaneously and/or consecutively. Thus, the database engine component 640 may relieve various bottlenecks encountered with traditional or general-purpose servers.

Any two or more of the components 632-640 described above may be combined. For example, two or more of the processor component 632, the memory component 634, the data storage component 636, the communication component and/or interface 638, and/or the data engine component 640 may be combined. Further, the combined component may take the form of one or more processors, DSPs, SOCs, FPGAs, and/or ASICs, among other types of processing devices and/or components described herein. For example, the combined component may take the form an SOC that integrates various other components in a single chip with digital, analog, and/or mixed-signal functions, all incorporated within the same substrate. As such, the SOC may be configured to carry out various operations of the components 632-640.

The components 632-640 described above may provide advantages over traditional or general-purpose servers and/or computers. For example, the components 632-640 may enable the system 600 to transfer data over the one or more communication networks 618 to numerous other client devices, such as the client devices 104 and/or 106. In particular, the components 632-640 may enable the system 600 to determine results and/or assessment scores for numerous entities locally from a single server tray 604. In some instances, configuring a separate and/or dedicated processing component 632 to determine results and/or assessment scores may optimize operations beyond the capabilities of traditional servers including general-purpose processors. As such, the average wait time for the client device 104 to display generated results and/or assessment scores may be minimized to a fraction of a second.

It can be appreciated that the system 600, the chassis 602, the trays 604 and 606, the slots 608 and 610, the power supply 612, the communication network 618, and the components 632-640 may be deployed in other ways. The operations performed by components 632-640 may be combined or separated for a given embodiment and may be performed by a greater number or fewer number of components or devices. Further, one or more components or devices may be operated and/or maintained by the same or different entities.

As noted, the one or more processor components 632 may perform a number of operations with the neural network 200. In some instances, the input layer 202 includes a number of nodes 208-244 that corresponds to a number of features and/or characteristics of the normalized data 116. For example, each of the nodes 208-244 may correspond to one or more of assets, liabilities, banking statements, revenue, costs, profits, the age of the companies, the number of employees, trustworthiness, dependability, credibility, creditworthiness, solvency, and/or risk indicated by the normalized data 116. Further, the neural network 200 further includes a hidden layer 204 with a number of nodes 224-230. As such, the operations may include transferring the normalized data 116 from the hidden layer 204 to the output layer 206, where the one or more results 118 may be generated based on the transferring the normalized data 116 from the hidden layer 204 to the output layer 206.

In some embodiments, one or more processor components 632 may include the training module 104 described above. Further, the one or more processor components 632 may perform operations described above in relation to FIG. 3A. For example, the operations may include loading, by the training module 104, float data 312 with the normalized data 116, where the float data 312 indicates a staff replacement rate associated with the one or more entities. Further, the operations may include creating, by the training module 104, a decision tree 316 based on the float data 312. Yet further, the operations may include combining 318, by the training module 104, the float data with the normalized data 116 based at least on the decision tree 316.

In some embodiments, the one or more processor components 632 may perform operations including retrieving a number of samples from the collected data 114, where the one or more mean values described above corresponds to a number of the samples. Further, the one or more outliers may be removed based at least on a determination whether a given sample from the number of samples minus the one or more mean values is greater than the number of the number of samples multiplied by a standard deviation of the plurality of samples, as described using the formula or function below:

if (sample ($x$)−mean)>number of samples ($n$)*stdv,
then sample ($x$) is an outlier As shown above, the one or more outliers may be removed based on a determination whether the given sample minus the one or more mean values is greater than the number of samples multiplied by the standard deviation.

In some embodiments, the one or more results 118 include an assessment score associated with the one or more entities. Further, the one or more processor components 632 may perform operations including determining an error value based on the assessment score and an expected score. Yet further, the operations may include determining whether the neural network 200 is configured for production based at least on the error value in comparison with a tolerance limit, as further described herein.

Figure 7:
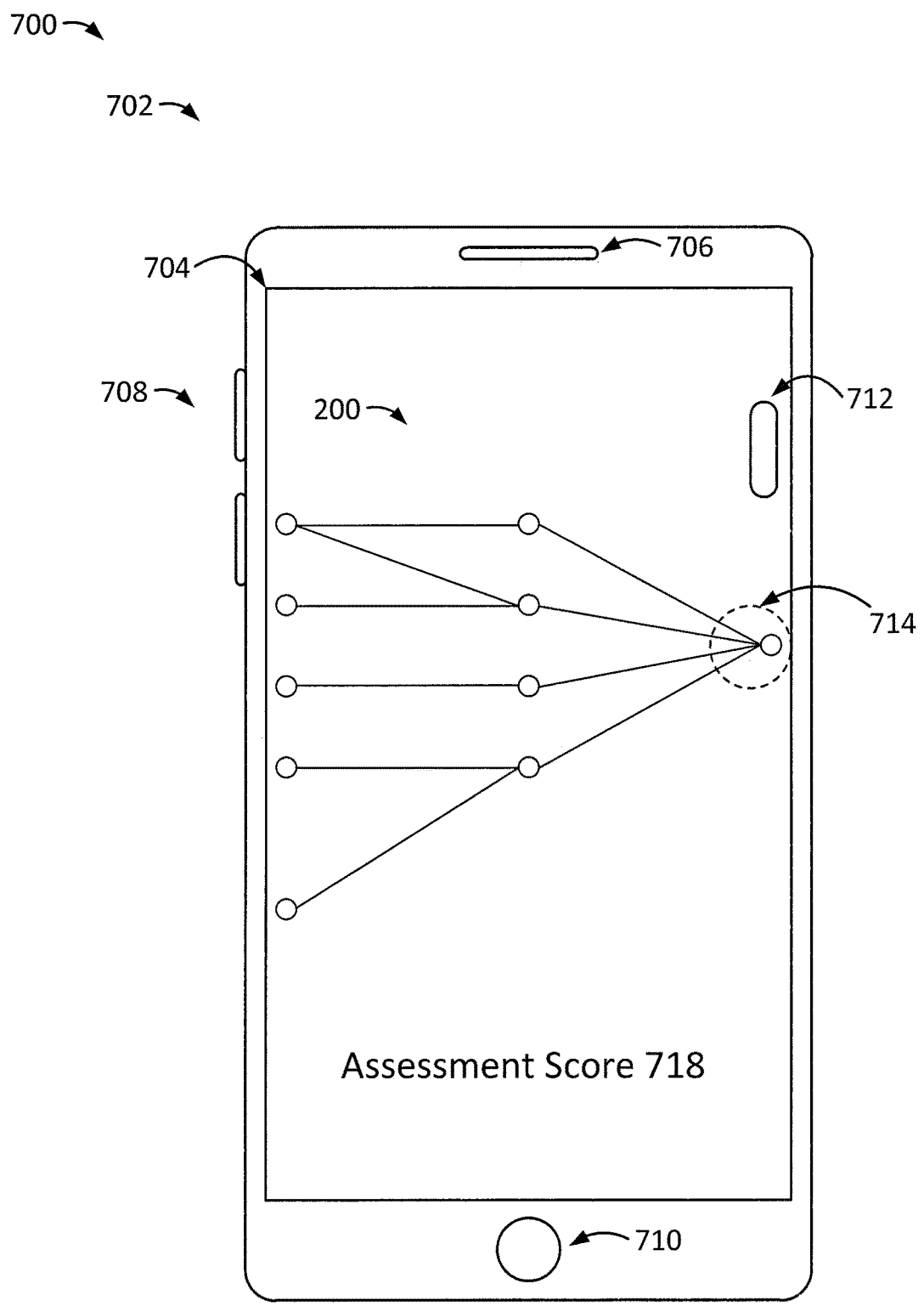
FIG. 7 illustrates an exemplary system with a client device, according to an embodiment.

FIG. 7 illustrates an exemplary system 700 with a client device 702, according to an embodiment. In some embodiments, the system 700, possibly referred to a smartphone system 700, may include aspects of the system 500 such that the client device 702 takes the form of the client device 504. As shown, the smartphone system 700 may include a display or an input/output (I/O) interface 704 that takes the form of the I/O interface 530 described above. The smartphone system 700 may also include a speaker/microphone 706, one or more side buttons 708, and a button 710, among other possible hardware components. The smartphone system 700 may also include a non-transitory machine-readable medium having stored thereon machine-readable instructions executable to cause a machine, such as the smartphone system 700, to perform the operations described herein. The smartphone system 700 may also include one or more hardware processors that may take the form of the processor 534. The one or more hardware processors may be coupled to the non-transitory machine-readable medium, e.g., the data storage 536, and configured to read the instructions to cause the smartphone system 700 to perform operations.

In some embodiments, the client device 702 may display the neural network 200 on the graphical user interface 704. In particular, the scroll bar 712 may be moved to display various aspects of the neural network 200 on the I/O interface 704. Further, the I/O user interface 704 may receive inputs, such as the touch input 714. As such, the assessment score 718 associated with one or more entities may be provided on the I/O interface 704. Notably, the touch input 714 may be positioned on various nodes and/or edges of the neural network 200 to display functions, weights, inputs, outputs, values, weighted values, among other aspects of the neural network 200. For example, by making the touch input 714 on a particular node of the neural network, one or more functions, $f_{node}$(input data), may be displayed on the I/O interface 704 to inform the user how the assessment score 718 is generated.

In some embodiments, the I/O interface 704 may provide an assessment score application, possibly an application downloaded to the smartphone system 700. For example, the assessment score application may provide various assessment scores 718 and/or changes to the assessment scores 718 in real-time based on detecting various data associated with a given entity. The various data, such as the data 522 and/or 524 described in FIG. 5, may be detected over the one or more networks 508. In particular, an alert of the application may activate the I/O interface 704 to cause the I/O interface 704 to display the assessment score 718 or changes to the assessment score 718, possibly also with aspects of the neural network 200. The alert may activate the I/O interface 704 based on a URL connection with the server 502 over the one or more networks 508, e.g., the Internet, as described above.

The present disclosure, the accompanying figures, and the claims are not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure.

The invention claimed is:

1. A system, comprising:
   a data engine configured to transmit data to a neural network comprising an input layer and an output layer;
   a non-transitory memory storing instructions; and
   one or more hardware processors coupled to the non-transitory memory and configured to read the instructions to cause the system to perform operations comprising:
   collecting, by a training module of the data engine, data associated with one or more entities, wherein the data comprises textual data;
   processing, by the training module, the data associated with the one or more entities such that the textual data is converted to numerical data;
   loading, by the training module, float data indicating a turnover rate associated with the one or more entities;
   accessing, by the training module, a decision tree based at least on the float data;
   combining, by the training module, the float data with the normalized data based at least on the decision tree;
   removing, by the training module, one or more outliers from the normalized data based at least on a deviation of the one or more outliers from one or more mean values of the processed data;
   in response to removing the one or more outliers, configuring the neural network with a transfer of the normalized data to the input layer of the neural network; and generating, by a working module of the data engine, one or more results from the output layer of the neural network based at least on the transfer of the normalized data to the input layer.

2. The system of claim 1, wherein the float data indicates an inventory reduction rate.

3. The system of claim 1, wherein the collected data associated with the one or more entities comprises at least one of credibility data that indicates a level of credibility associated with the one or more entities, asset data that indicates a number of assets of the one or more entities, and feature data that indicates a plurality of features associated with the one or more entities.

4. The system of claim 1, the operations further comprising:
   determining a given sample from a plurality of samples associated with the collected data, wherein one or more mean values corresponds to the plurality of samples;
   determining a number of samples from the plurality of samples and a standard deviation of the plurality of samples; and
   detecting the one or more outliers based at least on the given sample, the one or more mean values, the number of samples, and the standard deviation, wherein the one or more outliers is removed based at least on detecting the one or more outliers.

5. The system of claim 4, wherein the one or more outliers is removed based at least on a determination whether the at least given sample minus the one or more mean values is greater than the number of samples multiplied by the standard deviation.

6. The system of claim 1, wherein the neural network comprises a plurality of nodes, and wherein the neural network is configured based at least on one or more functions of each node applied to the normalized data transferred to the input layer.

7. The system of claim 1, wherein the neural network comprises a plurality of nodes such that each pair of nodes comprises a respective edge, and wherein the respective edge carries a respective weight such that a respective output flowing through the respective node is multiplied by the respective weight.

8. The system of claim 1, wherein each node of a plurality of nodes from the neural network corresponds to a respective threshold value, wherein the operations further comprise:
   determining a respective output from each node from the plurality of nodes;
   determining the respective output meets or exceeds the respective threshold value associated with each node; and
   in response to the respective output meeting or exceeding the respective threshold value, determining whether to cause the respective output to flow out of each node.

9. The system of claim 1, wherein the one or more results comprises an assessment score associated with the one or more entities, the operations further comprising:
   determining an error value based at least on the assessment score and an expected score; and
   determining whether the neural network is configured for production based at least on the error value in comparison with a tolerance limit.

10. A non-transitory machine-readable medium having stored thereon machine-readable instructions executable to cause a machine to perform operations comprising:
    loading, by a training module of a data engine, data associated with one or more entities;
    normalizing, by the training module, the data associated with the one or more entities;
    loading, by the training module, float data indicating a turnover rate associated with the one or more entities;
    creating, by the training module, a decision tree based at least on the float data;
    combining, by the training module, the float data with the normalized data based at least on the decision tree;
    removing, by the training module, one or more outliers from the normalized data based at least on a deviation of the one or more outliers from one or more mean values of the normalized data;
    in response to removing the one or more outliers, configuring a neural network with a transfer of the normalized data to an input layer of the neural network; and
    generating, by a working module of the data engine, one or more results from an output layer of the neural network based at least on the transfer of the normalized data to the input layer.

11. The non-transitory machine-readable medium of claim 10, wherein the input layer comprises a number of nodes that corresponds to a number of features of the normalized data, and wherein the neural network further comprises a hidden layer with a plurality of nodes, the operations further comprising transferring the normalized data from the hidden layer to the output layer, wherein the one or more results is generated based at least on the transferring the normalized data from the hidden layer to the output layer.

12. The non-transitory machine-readable medium of claim 10, wherein the float data indicates a staff replacement rate.

13. The non-transitory machine-readable medium of claim 10, the operations further comprising retrieving a plurality of samples from the collected data, wherein the one or more mean values corresponds to a number of samples from the plurality of samples, and wherein the one or more outliers is removed based at least on a determination whether a given sample from the plurality of samples minus the one or more mean values is greater than the number of samples from the plurality of samples multiplied by a standard deviation of the plurality of samples.

14. The non-transitory machine-readable medium of claim 10, wherein the one or more results comprises an assessment score associated with the one or more entities, the operations further comprising:
    determining an error value based at least on the assessment score and an expected score; and
    determining whether the neural network is configured for production based at least on the error value in comparison with a tolerance limit.

15. A method, comprising:
    detecting, by a working module of a data engine, data associated with one or more entities;
    transferring, by the working module, the detected data to an input layer of a neural network of the data engine, the neural network configured based at least on float data indicating a turnover rate associated with one or more training entities and on normalized data associated with the one or more training entities, wherein the float data and the normalized data are combined based at least on a decision tree created based at least on the float data;
    transferring, by the working module, training data associated with the one or more entities to the input layer of the neural network; and generating, by the working module, one or more results from an output layer of the neural network based at least on transferring the detected data and the training data to the input layer of the neural network.

16. The method of claim 15, wherein the float data indicates an employee turnover rate.

17. The method of claim 15, wherein the neural network further comprises a hidden layer, the method further comprising transferring the detected data and the training data from the input layer through the hidden layer to the output layer, wherein the one or more results is generated based at least on transferring the detected data and the training data through the hidden layer to the output layer.

18. The method of claim 15, wherein the neural network comprises a plurality of nodes, and wherein the one or more results is generated based at least on one or more functions of each node applied to the detected data and the training data transferred to the input layer.

19. The method of claim 15, wherein the neural network comprises a plurality of nodes such that each pair of nodes comprises a respective edge with a respective weight, and wherein the one or more results is generated based at least on one or more functions of each node and the respective weight applied to the detected data and the training data being transferred to the input layer.

20. The method of claim 15, wherein each node of a plurality of nodes from the neural network corresponds to a respective threshold value, wherein the method further comprises:

determining a respective output from each node from the plurality of nodes;

determining the respective output meets or exceeds the respective threshold value associated with each node; and in response to the respective output meeting or exceeding the respective threshold value, causing the respective output to flow out of the node.

* * * * *